United States Patent
Toyoda et al.

(10) Patent No.: US 10,256,449 B2
(45) Date of Patent: Apr. 9, 2019

(54) POROUS MEMBRANE SEPARATOR FOR SECONDARY BATTERY, METHOD FOR PRODUCING THE SAME, AND SECONDARY BATTERY

(71) Applicant: ZEON CORPORATION, Tokyo (JP)

(72) Inventors: Yujiro Toyoda, Tokyo (JP); Takuya Kaneda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 138 days.

(21) Appl. No.: 14/431,576

(22) PCT Filed: Sep. 19, 2013

(86) PCT No.: PCT/JP2013/075363
§ 371 (c)(1),
(2) Date: Mar. 26, 2015

(87) PCT Pub. No.: WO2014/050708
PCT Pub. Date: Apr. 3, 2014

(65) Prior Publication Data
US 2015/0270523 A1    Sep. 24, 2015

(30) Foreign Application Priority Data
Sep. 28, 2012  (JP) ................. 2012-218328

(51) Int. Cl.
| H01M 2/16 | (2006.01) |
| H01M 2/14 | (2006.01) |
| B01D 67/00 | (2006.01) |
| H01M 10/0525 | (2010.01) |
| H01M 10/0585 | (2010.01) |
| B01D 71/40 | (2006.01) |
| B01D 71/42 | (2006.01) |
| B01D 71/76 | (2006.01) |

(52) U.S. Cl.
CPC ...... *H01M 2/1686* (2013.01); *B01D 67/0046* (2013.01); *H01M 2/145* (2013.01); *H01M 2/168* (2013.01); *H01M 2/1653* (2013.01); *B01D 71/40* (2013.01); *B01D 71/42* (2013.01); *B01D 71/76* (2013.01); *H01M 10/0525* (2013.01); *H01M 10/0585* (2013.01)

(58) Field of Classification Search
CPC ................. H01M 2/16; H01M 2/14
See application file for complete search history.

(56) References Cited

U.S. PATENT DOCUMENTS

| 9,070,935 B2 | 6/2015 | Murata et al. |
| 2003/0064284 A1 | 4/2003 | Yoshida et al. |
| 2003/0215704 A1* | 11/2003 | Satsuma ............. H01M 2/1673 429/142 |
| 2007/0077837 A1* | 4/2007 | Lundquist .................. C08J 5/04 442/157 |
| 2009/0291360 A1* | 11/2009 | Kim ..................... H01M 2/1653 429/145 |
| 2010/0323230 A1* | 12/2010 | Lee ........................ H01M 2/166 429/143 |
| 2011/0318630 A1* | 12/2011 | Wakizaka ........... H01M 2/1653 429/144 |
| 2014/0212728 A1 | 7/2014 | Kaneda et al. |

FOREIGN PATENT DOCUMENTS

| CN | 101687404 A | 3/2010 | |
| EP | 2755256 A1 | 7/2014 | |
| JP | H01-130973 A | 5/1989 | |
| JP | 2000-149660 A | 5/2000 | |
| JP | 2000149660 A * | 5/2000 | |
| JP | 2003-109667 A | 4/2003 | |
| JP | 2006-299144 A | 11/2006 | |
| JP | 2010-009940 A | 1/2010 | |
| JP | WO 2010074202 A1 * | 7/2010 | .......... H01M 2/1653 |
| JP | 2011-005670 A | 1/2011 | |
| JP | 2011-008966 A | 1/2011 | |
| JP | 4657019 B2 | 1/2011 | |
| WO | 2013/035795 A1 | 3/2013 | |

OTHER PUBLICATIONS

Translation of Written Opinion of the International Searching Authority; PCT/JP2013/075363.
International Search Report; PCT/JP2013/075363; dated Nov. 12, 2013.
The extended European search report issued by the European Patent Office dated Apr. 18, 2016, which corresponds to European Patent Application No. 13840465.2-1360 and is related to U.S. Appl. No. 14/431,576.

* cited by examiner

*Primary Examiner* — Barbara L Gilliam
*Assistant Examiner* — Nathanael T Zemui
(74) *Attorney, Agent, or Firm* — Studebaker & Brackett PC

(57) ABSTRACT

A porous membrane separator for a secondary battery, comprising a separator substrate, a porous membrane formed on at least one surface of the separator substrate, and an adhesive layer formed on the porous membrane, wherein: the porous membrane contains non-conductive particles and a water-soluble maleimide-maleic acid copolymer including a specific structural unit (a) a structural unit (b); and the adhesive layer contains a particulate polymer having a glass transition temperature of 10° C. or higher and 110° C. or lower.

7 Claims, No Drawings

POROUS MEMBRANE SEPARATOR FOR SECONDARY BATTERY, METHOD FOR PRODUCING THE SAME, AND SECONDARY BATTERY

FIELD

The present invention relates to a porous membrane separator for a secondary battery, a method for producing the same, and a secondary battery including the same.

BACKGROUND

Among batteries of practical use, lithium-ion secondary batteries have a highest energy density and are often used particularly for small-size electronics. In addition to such small-size uses, lithium-ion secondary batteries are also expected for use in automobiles. Secondary batteries such as such lithium-ion secondary batteries usually include a positive electrode, a negative electrode, a separator, and a non-aqueous electrolyte solution. A variety of studies on materials of these battery components have been made aiming at improvement of the battery performance (see Patent Literatures 1 and 2).

CITATION LIST

Patent Literature

Patent Literature 1: Japanese Patent No. 4657019 B
Patent Literature 2: Japanese Patent Application Laid-Open No. 2010-9940 A

SUMMARY

Technical Problem

Operation of secondary batteries generally involves heat generation. Consequently, the separator made of stretched resin such as a stretched polyethylene resin is also heated. The separator made of a stretched resin easily shrinks even at temperatures of about 150° C. or lower. When the separator shrinks, short circuit may occur in secondary batteries. Therefore, there is a demand for the technique for increasing the anti-heatshrink ability of the separator from the viewpoint of increasing the safety of secondary batteries.

From the viewpoint of preventing short circuit in secondary batteries due to the aforementioned shrinkage of the separator, strong adhesion of the separator to the electrode is preferred. Strong adhesion of the electrode to the separator may reduce shrinkage of the separator by virtue of the adhesive strength with the electrode to prevent short circuit even when the shrinkage stress is generated to the separator. Therefore, there is a demand for the technique for enabling adhesion of the separator to the electrode with high adhesive strength.

Furthermore, separators generally have a sheet shape. These sheet-shaped separators are usually wound in a roll form for transporting and storing. However, when separator causes blocking, piled separator layers in a roll form may stick together to impair the handleability. In general, separators having better adhesion property to electrodes are more likely to generate blocking. Consequently, in a development of separators that can adhere to electrodes with high adhesive strength, it was difficult to pursue blocking resistance of such separators.

The present invention has been made in light of the aforementioned problems, and the object of the present invention is to provide a porous membrane separator for a secondary battery which has excellent anti-heatshrink ability and blocking resistance and which can adhere to an electrode with high adhesive strength, a method for producing the porous membrane separator, and a secondary battery including the porous membrane separator.

Solution to Problem

The present inventors have intensively studied to solve the aforementioned problems. As a result, the present inventors have found out that a porous membrane separator for a secondary battery has excellent anti-heatshrink ability and blocking resistance and can adhere to an electrode with high adhesive strength when the porous membrane separator comprises a separator substrate, a porous membrane formed on at least one surface of the separator substrate, and an adhesive layer formed on the porous membrane, the porous membrane containing non-conductive particles and a specific maleimide-maleic acid copolymer, the adhesive layer containing a particulate polymer that has a specific glass transition temperature. The present inventors have thus completed the present invention.

Specifically, the present invention is as follows.

(1) A porous membrane separator for a secondary battery, comprising a separator substrate, a porous membrane formed on at least one surface of the separator substrate, and an adhesive layer formed on the porous membrane, wherein the porous membrane contains non-conductive particles and a water-soluble maleimide-maleic acid copolymer including a structural unit (a) represented by the following formula (I) and a structural unit (b) represented by the following formula (II), and the adhesive layer contains a particulate polymer having a glass transition temperature of 10° C. or higher and 110° C. or lower,

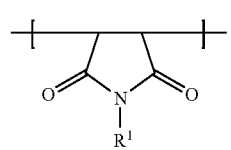
(I)

(in the formula (I), $R^1$ represents at least one selected from the group consisting of a hydrogen atom, C1 to C6 alkyl groups, C3 to C12 cycloalkyl groups, a phenyl group, a phenyl group substituted by a C1 to C6 alkyl group, a phenyl group substituted by a C1 to C6 alkyloxy group, a phenyl group substituted by a halogen atom, and a hydroxyphenyl group),

(II)

(in the formula (II), X represents a maleic acid unit, X may be partially neutralized by an ion other than a hydrogen ion, or may be partially dehydrated, or may be partially esterified).

(2) The porous membrane separator for a secondary battery according to (1), wherein the maleimide-maleic acid copolymer includes the structural unit (a) at 5 mol % or more and 75 mol % or less, and the structural unit (b) at 5 mol % or more and 75 mol % or less.

(3) The porous membrane separator for a secondary battery according to (1) or (2), wherein the maleimide-maleic acid copolymer further includes a structural unit (c) represented by the following formula (III),

 (III)

(in the formula (III), Y represents a C2 to C12 hydrocarbon group).

(4) The porous membrane separator for a secondary battery according to any one of (1) to (3), wherein the particulate polymer includes a crosslinkable monomer unit, and the content ratio of the crosslinkable monomer unit in the particulate polymer is 0.01% by weight or more and 5% by weight or less.

(5) The porous membrane separator for a secondary battery according to any one of (1) to (4), wherein a content amount of the maleimide-maleic acid copolymer is 0.1 parts by weight or more and 30 parts by weight or less relative to 100 parts by weight of the non-conductive particles.

(6) A method for producing a porous membrane separator for a secondary battery, the method comprising the steps of:

applying a porous membrane slurry onto at least one surface of a separator substrate, the porous membrane slurry containing non-conductive particles and a water-soluble maleimide-maleic acid copolymer including a structural unit (a) represented by the following formula (I) and structural unit (b) represented by the following formula (II), followed by drying to form a porous membrane; and applying an adhesive layer slurry onto the porous membrane, the adhesive layer slurry containing a particulate polymer having a glass transition temperature of 10° C. or higher and 100° C. or lower, followed by drying to form an adhesive layer.

(7) A secondary battery, comprising a positive electrode, a negative electrode, the porous membrane separator for a secondary battery according to any one of (1) to (5), and an electrolyte solution.

Advantageous Effects of Invention

The present invention can achieve a porous membrane separator for a secondary battery which has excellent anti-heatshrink ability and blocking resistance and can adhere to an electrode with high adhesive strength, a method for producing the porous membrane separator, and a secondary battery including the porous membrane separator.

DESCRIPTION OF EMBODIMENTS

The present invention will be described hereinbelow in detail by way of embodiments and illustrations. However, the present invention is not limited to the following embodiments and illustrations and may be optionally modified and practiced without departing from the scope of claims of the present invention and the scope of their equivalents.

In the following description, (meth)acrylic acid means acrylic acid and methacrylic acid. (Meth)acrylate means acrylate and methacrylate. Furthermore, (meth)acrylonitrile means acrylonitrile and methacrylonitrile.

In addition, a substance being water-soluble means that less than 0.5% by weight of the substance remains insoluble at 25° C. when 0.5 g of the substance is added to 100 g of water. On the other hand, a substance being water-insoluble means that not less than 90% by weight of the substance remains insoluble at 25° C. when 0.5 g of the substance is added to 100 g of water.

[1. Summary]

The porous membrane separator for a secondary battery of the present invention (this separator may be appropriately referred to hereinbelow as a "porous membrane separator") comprises a separator substrate, a porous membrane formed on at least one surface of the separator substrate, and an adhesive layer formed on the porous membrane. The porous membrane separator of the present invention has excellent anti-heatshrink ability and blocking resistance and can adhere to an electrode with high adhesive strength.

The porous membrane separator of the present invention may be produced by a production method including the step of applying a porous membrane slurry onto at least one surface of the separator substrate, followed by drying to form a porous membrane, and the step of applying an adhesive layer slurry onto the porous membrane, followed by drying to form an adhesive layer. As used herein, the porous membrane slurry refers to a liquid composition containing materials of the porous membrane. The adhesive layer slurry refers to a liquid composition containing materials of the adhesive layer.

[2. Separator Substrate]

As the separator substrate, e.g., a porous substrate having fine pores may be used. Use of such a separator substrate can prevent electrode short circuit in the secondary battery without inhibiting charging and discharging of the battery. As the separator substrate, a porous substrate made of an organic material (i.e., organic separator) is usually used. Specific examples of the separator substrate may include micropore membranes and nonwoven fabrics which contain, e.g., polyolefin resins such as polyethylene and polypropylene, or aromatic polyamide resins.

The thickness of the separator substrate is usually 0.5 μm or more and preferably 1 μm or more, and usually 40 μm or less, preferably 30 μm or less, and more preferably 10 μm or less. The thickness in this range reduces the resistance due to the separator substrate in the battery and also provides good working efficiency during battery production.

[3. Porous Membrane]

The porous membrane separator of the present invention includes a porous membrane(s) on at least one surface, preferably both surfaces of the separator substrate. The porous membrane contains non-conductive particles and a water-soluble maleimide-maleic acid copolymer.

[3.1. Non-Conductive Particles]

As the non-conductive particles, any of inorganic particles and organic particles may be used.

Inorganic particles have excellent dispersion stability in solvents. Inorganic particles thus have low tendency to precipitate in the porous membrane slurry, so that a uniform slurry state can be usually kept for a long period of time. Use of inorganic particles can usually increase the thermal resistance of the porous membrane. As the materials of the non-conductive particles, electrochemically stable materials are preferred. From such a viewpoint, preferred examples of inorganic materials of the non-conductive particles may include particles of oxides such as aluminum oxide (alumina), aluminum oxide hydrates (boehmite (AlOOH), gibbsite (Al(OH)$_3$)), silicon oxide, magnesium oxide (magnesia), magnesium hydroxide, calcium oxide, titanium oxide (titania), BaTiO$_3$, ZrO, and an alumina-silica complex oxide; particles of nitrides such as aluminum nitride and boron nitride; particles of covalent crystals such as silicon and diamond; insoluble particles of ionic crystals such as barium sulfate, calcium fluoride, and barium fluoride; and particles of clays such as talc and montmorillonite. Of these, particles of oxides are preferred from the viewpoint of stability in an electrolyte solution and electropotential stability. In particular, titanium oxide, aluminum oxide, aluminum oxide hydrate, magnesium oxide, and magnesium hydroxide are more preferred from the viewpoint of low water absorption and excellent thermal resistance (for example, resistance to high temperature of 180° C. or more); aluminum oxide, aluminum oxide hydrate, magnesium oxide, and magnesium hydroxide are still more preferred; and aluminum oxide is particularly preferred.

As the organic particles, a particulate polymer is usually used. The affinity of the organic particles to water can be controlled by adjusting the type and amount of a functional group(s) on the surface of the organic particles, whereby the water content in the porous membrane can be controlled. The organic particles usually have an advantage of low tendency of metal ion elution. Preferred examples of organic materials of the non-conductive particles may include a variety of polymers such as polystyrene, polyethylene, polyimide, melamine resin, and phenol resin. The polymers forming the particles may be used even in a form of, e.g., mixtures, modified forms, derivatives, random copolymers, alternating copolymers, graft copolymers, block copolymers, or crosslinked forms. The organic particles may be formed by a mixture of two or more polymers.

When the organic particles are used as the non-conductive particles, the organic particles do not necessarily have a glass transition temperature. When the organic material forming the organic particles has a glass transition temperature, the glass transition temperature is usually 150° C. or higher, preferably 200° C. or higher, and more preferably 250° C. or higher, and usually 400° C. or lower.

The non-conductive particles may be optionally subjected to, e.g., element substitution, surface treatment, or solid solution formation. A single non-conductive particle may contain one of the aforementioned materials singly or may contain two or more of the aforementioned materials in combination at any ratio. In addition, the non-conductive particles for use may be in combination of two or more types of particles made of different materials.

Examples of the shape of the non-conductive particles may include spherical shape, ellipsoidal shape, polygonal shape, tetrapod (registered trademark) shape, plate shape, and scale shape. Among them, tetrapod (registered trademark) shape, plate shape, and scale shape are preferred from the viewpoint of increasing the void ratio of the porous membrane to prevent a decrease in ion conductivity due to the porous membrane separator.

The volume average particle diameter D50 of the non-conductive particles is usually 0.1 μm or more and preferably 0.2 μm or more, and usually 5 μm or less, preferably 2 μm or less, and more preferably 1 μm or less. Use of the non-conductive particles having such a volume average particle diameter D50 provides a uniform porous membrane even with a thin thickness, and thus can increase the battery capacity. As used herein, the volume average particle diameter D50 represents a particle diameter at 50% of the cumulative volume calculated from the smaller diameter side in the particle diameter distribution measured by laser diffractometry.

The BET specific surface area of the non-conductive particles is, e.g., preferably 0.9 m$^2$/g or more, and more preferably 1.5 m$^2$/g or more. From the viewpoint of preventing aggregation of the non-conductive particles for optimizing fluidity of the porous membrane slurry, it is preferable that the BET specific surface area is not too large and is, e.g., 150 m$^2$/g or less.

[3.2. Maleimide-Maleic Acid Copolymer]

As the maleimide-maleic acid copolymer, polymers including a structural unit (a) represented by the following formula (I) and a structural unit (b) represented by the following formula (II) are used. This maleimide-maleic acid copolymer is a polymer having excellent thermal resistance. This allows the porous membrane containing this maleimide-maleic acid copolymer to have high anti-heatshrink ability. Therefore, the porous membrane separator of the present invention has low tendency to cause heat shrinkage, and thus stably prevents short circuit, whereby a secondary battery with high safety can be realized. This maleimide-maleic acid copolymer is a water-soluble polymer, whereas the copolymer also has a tendency of smoothly discharging water when it is dried. For this reason, the porous membrane containing this maleimide-maleic acid copolymer can usually have a reduced residual water content. Therefore, the secondary battery including the porous membrane separator of the present invention can prevent electrolyte solution decomposition caused by residual water and thus can suppress expansion of the secondary battery due to the electrolyte solution decomposition, to thereby improve the cycle property.

[3.2.1. Structural Unit (a)]

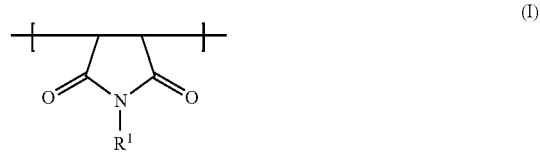

In the formula (I), R$^1$ represents at least one selected from the group consisting of a hydrogen atom, C1 to C6 alkyl groups, C3 to C12 cycloalkyl groups, a phenyl group, a phenyl group substituted by a C1 to C6 alkyl group, a phenyl group substituted by a C1 to C6 alkyloxy group, a phenyl group substituted by a halogen atom, and a hydroxyphenyl group.

The structural unit (a) represented by the formula (I) represents a maleimide unit of the maleimide-maleic acid copolymer. The structural unit (a) represented by the formula (I) may be derived from, e.g., the maleimide represented by the following formula (I-1).

In the formula (I-1), R$^2$ represents at least one selected from the group consisting of a hydrogen atom, C1 to C6 alkyl groups, C3 to C12 cycloalkyl groups, a phenyl group, phenyl groups substituted by C1 to C6 alkyl groups, phenyl groups substituted by C1 to C6 alkyloxy groups, phenyl groups substituted by halogen atoms, and a hydroxyphenyl group.

Specific examples of the maleimides represented by the formula (I-1) may include maleimide; N-methylmaleimide, N-ethylmaleimide, N-propylmaleimide, N-butylmaleimide, N-pentylmaleimide, N-hexylmaleimide; N-phenylmaleimide; N-(2-methylphenyl)maleimide, N-(3-methylphenyl) maleimide, N-(4-methylphenyl)maleimide, N-(2-ethylphenyl)maleimide, N-(3-ethylphenyl)maleimide, N-(2-n-propylphenyl)maleimide, N-(2-i-propylphenyl)maleimide, N-(2-n-butylphenyl)maleimide, N-(2,6-dimethylphenyl)maleimide, N-(2,4,6-trimethylphenyl)maleimide, N-(2,6-diethylphenyl)maleimide, N-(2,4,6-triethylphenyl)maleimide, N-(2-methoxypheny)maleimide, N-(2,6-dimethoxyphenyl)maleimide, N-(2-bromophenyl)maleimide, N-(2-chlorophenyl)maleimide, N-(2,6-dibromophenyl)maleimide; and N-(4-hydroxyphenyl)maleimide. Of these, maleimide is preferred from the viewpoint of the reactivity with the non-conductive particles. One type of them may be used alone, or two or more types thereof may be used in combination at any ratio.

The structural unit (a) represented by the formula (I) is also obtained by, e.g., imidizing the structural unit (b) represented by the formula (II).

In the maleimide-maleic acid copolymer, the content ratio of the structural unit (a) represented by the formula (I) is preferably 5 mol % or more, more preferably 10 mol % or more, and particularly preferably 15 mol % or more, and preferably 75 mol % or less, more preferably 60 mol % or less, and particularly preferably 45 mol % or less, relative to 100 mol % of the amount of all structure units. By setting the content ratio of the structural unit (a) in the maleimide-maleic acid copolymer to a ratio equal to or more than the lower limit of the aforementioned range, thermal resistance of the maleimide-maleic acid copolymer and anti-heatshrink ability of the porous membrane can be effectively increased. This can also improve the binding property between the non-conductive particles and the maleimide-maleic acid copolymer. By setting the content ratio to equal to or less than the upper limit, swelling property of the maleimide-maleic acid copolymer with the electrolyte solution in the secondary battery can be lowered, to thereby improve the cycle property of the secondary battery.

[3.2.2. Structural Unit (b)]

(II)

In the formula (II), X represents a maleic acid unit. As used herein, the maleic acid unit refers to a structural unit having a structure formed by polymerization of maleic acid. X may be partially neutralized by ions other than a hydrogen ion, or may be partially dehydrated, or may be partially esterified.

The structural unit (b) represented by the formula (II) may be derived from, e.g., the maleic acids represented by the following formula (II-1) or the maleic anhydride represented by the formula (II-2).

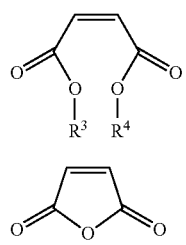

In the formula (II-1), $R^3$ and $R^4$ represent at least one selected from a hydrogen atom, alkyl groups, alkali metal ions, alkaline earth metal ions, an ammonium ion, alkyl ammonium ions, and alkanol ammonium ions. As used herein, the alkyl ammonium ion refers to a cation in which one hydrogen atom is attached to the nitrogen atom of alkylamine. The alkanol ammonium ion refers to a cation in which one hydrogen atom is attached to the nitrogen atom of alkanolamine. In this case, $R^3$ and $R^4$ may be the same as or different from each other. When $R^3$ or $R^4$ is an alkyl group, the formula (II-1) represents maleic acid esters. When $R^3$ or $R^4$ is an alkali metal ion, alkaline earth metal ion, ammonium ion, alkyl ammonium ion, or alkanol ammonium ion, the formula (II-1) represents maleic acid salts.

Examples of the maleic acid esters may include monomethyl maleate, dimethyl maleate, monoethyl maleate, diethyl maleate, monopropyl maleate, and dipropyl maleate.

Examples of the maleic acid salt may include alkaline metal salts of maleic acid such as monolithium maleate, dilithium maleate, monosodium maleate, disodium maleate, monopotassium maleate, and dipotassium maleate; alkaline earth metal salts of maleic acid such as calcium maleate and magnesium maleate; ammonium salts of maleic acid such as monoammonium maleate and dianmonium maleate; alkylamine salts of maleic acid such as monomethyl ammonium maleate, bismonomethyl ammonium maleate, monodimethyl ammonium maleate, and bisdimethyl ammonium maleate; and alkanolamine salts of maleic acid such as 2-hydroxyethyl ammonium maleate, bis-2-hydroxyethyl ammonium maleate, di(2-hydroxyethyl)ammonium maleate, and bis-di(2-hydroxyethyl)ammonium maleate.

One type of them may be used alone, or two or more types thereof may be used in combination at any ratio.

In the maleimide-maleic acid copolymer, the content ratio of the structural unit (b) represented by the formula (II) is preferably 5 mol % or more, more preferably 10 mol % or more, and particularly preferably 15 mol % or more, and preferably 75 mol % or less, more preferably 70 mol % or less, and particularly preferably 65 mol % or less, relative to 100 mol % of the amount of all structure units. By setting the content ratio of the structural unit (b) in the maleimide-maleic acid copolymer to a ratio equal to or more than the lower limit of the aforementioned range, water content in the porous membrane can be effectively lowered, to prevent electrolyte solution decomposition caused by residual water. This can suppress expansion of the secondary battery due to the electrolyte solution decomposition to improve the cycle property. By setting the content ratio to equal to or less than the upper limit, thermal resistance of the maleimide-maleic acid copolymer can be improved, to effectively increase the anti-heatshrink ability of the porous membrane.

[3.2.3. Structural Unit (c)]

It is preferable that the maleimide-maleic acid copolymer further includes a structural unit (c) represented by the formula (III) in addition to the structural unit (a) represented by the formula (I) and the structural unit (b) represented by the formula (II). When the maleimide-maleic acid copolymer includes the structural unit (c) represented by the formula (III), water content in the porous membrane can be further reduced, and cycle property of the secondary battery can be increased.

(III)

In the formula (III), Y represents C2 to C12 hydrocarbon groups. These hydrocarbon groups usually have a valence of 2.

The structural unit (c) represented by the formula (III) may be derived from hydrocarbon compounds such as olefinic hydrocarbons, such as ethylene, 1-butene, isobutene, 1-hexene, 4-methyl-1-pentene, 1-heptene, 1-octene, isobutylene, diisobutylene, 1-nonene, 1-decene, and 1-dodecen; and aromatic hydrocarbons, such as styrene and α-methylstyrene. One type of them may be used alone, or two or more types thereof may be used in combination at any ratio.

In the maleimide-maleic acid copolymer, the content ratio of the structural unit (c) represented by the formula (III) is preferably 5 mol % or more, more preferably 10 mol % or more, and particularly preferably 15 mol % or more, and preferably 75 mol % or less, more preferably 60 mol % or less, and particularly preferably 45 mol % or less, relative to 100 mol % of the amount of all structure units. By setting the content ratio of the structural unit (c) in the maleimide-maleic acid copolymer to a ratio equal to or more than the lower limit of the aforementioned range, thermal resistance of the maleimide-maleic acid copolymer can be effectively increased. This can improve the anti-heatshrink ability of the porous membrane separator. By setting the content ratio to equal to or less than the upper limit, water content in the porous membrane can be further reduced, to improve the cycle property of the secondary battery.

[3.2.4. Molecular Weight]

The weight-average molecular weight of the maleimide-maleic acid copolymer is preferably 50,000 or greater and 100,000 or smaller. The weight-average molecular weight of the maleimide-maleic acid copolymer may be measured as a value in terms of polystyrene by gel permeation chromatography (GPC) using N,N-dimethylformamide (DMF) as a developing solution.

[3.2.5. Amount of Maleimide-Maleic Acid Copolymer]

The amount of the maleimide-maleic acid copolymer is preferably 0.1 parts by weight or more and preferably 30 parts by weight or less relative to 100 parts by weight of the non-conductive particles. In particular, when the non-conductive particles are inorganic particles, the amount of the maleimide-maleic acid copolymer is more preferably 10 parts by weight or less and particularly preferably 5 parts by weight or less relative to 100 parts by weight of the non-conductive particles. When the non-conductive particles are organic particles, the amount of the maleimide-maleic acid copolymer is more preferably 3 parts by weight or more and more preferably 10 parts by weight or less relative to 100 parts by weight of the non-conductive particles. Furthermore, when inorganic particles and organic particles are used in combination as the non-conductive particles, it is preferable that the amount of the maleimide-maleic acid copolymer falls within the suitable range that is calculated from the weighted average on the basis of the quantitative ratio of the inorganic particles and the organic particles. For example, when X parts of the inorganic particles and 100−X parts of the organic particles are used in combination as 100 parts of the non-conductive particles ($0 \leq X \leq 100$), the amount of the maleimide-maleic acid copolymer is preferably $0.1 \times X/100 + 3 \times (100-X)/100$ parts by weight or more, and preferably $10 \times X/100 + 30 \times (100-X)/100$ parts by weight or less, $10 \times X/100 + 10 \times (100-X)/100$ parts by weight or less, $5 \times X/100 + 30 \times (100-X)/100$ parts by weight or less, or $5 \times X/100 + 10 \times (100-X)/100$ parts by weight or less. By setting the amount of the maleimide-maleic acid copolymer to an amount equal to or more than the lower limit of the aforementioned range, strength and binding property of the porous membrane can be increased, and coating property of the porous membrane slurry can be improved. By setting the amount to equal to or less than the upper limit, both strength and void ratio of the porous membrane can be increased, and thus both anti-shortcircuit property of the porous membrane separator and battery property of the secondary battery can be improved.

[3.2.6. Method for Producing Maleimide-Maleic Acid Copolymer]

Examples of the method for producing the maleimide-maleic acid copolymer may include the following process A and process B.

Process A: A process involving polymerization of the maleimide represented by the formula (I-1) with the maleic acid represented by the formula (II-1) or the maleic anhydride represented by the formula (II-2).

Process B: A process involving polymerization of the maleic acid represented by the formula (II-1) or the maleic anhydride represented by (II-2) and then allowing some of the structural units formed by the polymerization of the maleic acid or the maleic anhydride to react with a compound having a group $R^2$ in the formula (I-1) to form maleamic acid units, followed by cyclodehydration (imidization) of some of the formed maleamic acid units.

As the polymerization method in the process A, publicly known polymerization methods may be employed. Among them, a solution polymerization method is preferred because homogeneous polymerization is preferred. Examples of the solvent used in the solution polymerization method may include methanol, isopropyl alcohol, isobutyl alcohol, acetone, methyl ethyl ketone, methyl isobutyl ketone, cyclohexanone, ethyl acetate, butyl acetate, ethyl lactate, tetrahydrofuran, dioxane, butyl cellosolve, dimethylformamide, dimethyl sulfoxide, benzene, ethylbenzene, toluene, xylene, cyclohexane, ethylcyclohexane, and acetonitrile. One type of these solvents may be used alone, or two or more types thereof may be used in combination at any ratio. These solvents may be dehydrated before use.

The amount of the solvent used is usually 600 parts by weight or less and preferably 400 parts by weight or less, relative to 100 parts by weight of the maleimide-maleic acid copolymer to be produced. This can provide a maleimide-maleic acid copolymer having a high molecular weight. The lower limit is not particularly limited as long as a solution can be formed.

In the process A, polymerization materials are usually placed in a reaction container to carry out polymerization. In the polymerization, it is desirable that dissolved oxygen is previously removed from the reaction system by, e.g., vacuum deaeration or nitrogen displacement. In order to promote reaction efficiency, the polymerization temperature is preferably −50° C. or higher and more preferably 50° C. or higher, and preferably 200° C. or lower and more preferably 150° C. or lower. The polymerization time is preferably 1 hour or longer, and preferably 100 hours or shorter and more preferably 50 hours or shorter. By setting the polymerization temperature and the polymerization time in the aforementioned ranges, ease of polymerization control and productivity can be effectively enhanced.

In the process B, examples of the compound having a group $R^2$ in the formula (I-1) may include ammonia; and primary amines having groups $R^2$ such as aminophenol and normal butylamine. One type of these compounds may be used alone, or two or more types thereof may be used in combination at any ratio.

Examples of the process using a polymer including the unit obtained by polymerization of maleic anhydride as the process B may include the following process B-1 and process B-2 using copolymers of C2 to C12 hydrocarbon groups and maleic anhydride.

Process B-1: Aminophenol and a copolymer of a C2 to C12 hydrocarbon group and maleic anhydride are allowed to react in an organic solvent, such as dimethylformaldehyde, usually at reaction temperatures of 40° C. or higher and 150°

C. or lower usually for 1 hour to 20 hours. This converts some of the maleic anhydride units into N-(hydroxyphenyl) maleamic acid units. As used herein, the maleic anhydride unit refers to a structural unit having a structure formed by polymerization of maleic anhydride. The N-(hydroxyphenyl)maleamic acid unit refers to a structural unit having a structure formed by polymerization of the N-(hydroxyphenyl)maleamic acid units. An azeotropic solvent is then further added for removing water generated by cyclodehydration, and a cyclodehydration reaction is performed usually at reaction temperatures of 80° C. or higher and 200° C. or lower usually for 1 hour to 20 hours, to thereby obtain a maleimide-maleic acid copolymer.

Process B-2: Aminophenol and a copolymer of a C2 to C12 hydrocarbon group and maleic anhydride are allowed to react in an organic solvent, such as dimethylformaldehyde, in the presence of an azeotropic solvent usually at reaction temperatures of 80° C. or higher and 200° C. or lower usually for 1 hour to 20 hours. This allows some of the maleic anhydride units to undergo cyclodehydration reaction via the N-(hydroxyphenyl)maleamic acid units and thus to obtain a maleimide-maleic acid copolymer.

Specific examples of the copolymer of a C2 to C12 hydrocarbon group and maleic anhydride in the aforementioned processes B-1 and B-2 may include a copolymer of isobutylene and maleic anhydride (this may be appropriately referred to hereinbelow as an "isobutylene-maleic anhydride copolymer").

In any of the aforementioned processes B-1 to B-2, water may be removed without using an azeotropic solvent in the cyclodehydration reaction. For example, water may be removed at a temperature of 100° C. to 200° C. In addition, the dehydration reaction may be effectively carried out by flow of nitrogen gas.

Examples of the azeotropic solvent used for removing water generated in the aforementioned cyclodehydration reaction may include benzene, toluene, and xylene. One type of them may be used alone, or two or more types thereof may be used in combination at any ratio.

In the cyclodehydration reaction, 1 mol of water is generated from 1 mol of the N-(hydroxyphenyl)maleamic acid units which are produced by the reaction of aminophenol and the maleic anhydride units in the isobutylene-maleic anhydride copolymer. Using amount of the azeotropic solvent may be set to an amount that is sufficient for removing the generated water by azeotropy.

When the copolymer of a C2 to C12 hydrocarbon group and maleic anhydride is reacted with aminophenol in two stages as in the process B-1, the reaction temperature in the first stage of the reaction is usually 40° C. or higher and preferably 50° C. or higher, and usually 150° C. or lower and preferably 100° C. or lower. The reaction temperature in the second stage of the reaction is usually 80° C. or higher and preferably 100° C. or higher, and usually 200° C. or lower and preferably 150° C. or lower. The first stage of the reaction here means the reaction involving allowing the copolymer of a C2 to C12 hydrocarbon group and maleic anhydride to react with aminophenol to produce an N-(hydroxyphenyl)maleamic acid copolymer. The second stage of the reaction means the cyclodehydration reaction of the N-(hydroxyphenyl)maleamic acid copolymer.

When aminophenol and the copolymer of a C2 to C12 hydrocarbon group and maleic anhydride are allowed to react in one stage in the presence of the azeotropic solvent for dehydration as in the process B-2, the reaction temperature is usually 80° C. or higher and preferably 100° C. or higher, and usually 200° C. or lower and preferably 150° C. or lower.

In the processes B-1 to B-2, the reaction time for reacting aminophenol with the copolymer of a C2 to C12 hydrocarbon group and maleic anhydride may depend on, e.g., the reaction temperature, the amount of aminophenol used, and the objective reaction ratio. Examples of the aforementioned reaction ratio here may include the conversion ratio of the maleic anhydride units in the isobutylene-maleic anhydride copolymer into the N-(hydroxyphenyl)maleimide units. In the process B-1, the first stage and the second stage of the reactions each may usually take 1 hour to 20 hours. The reaction time in the process B-2 may also be 1 hour to 20 hours.

In the aforementioned processes, the content ratio of the structural unit (a) represented by formula (I) in the objective maleimide-maleic acid copolymer may be easily controlled by, e.g., adjusting the amount of aminophenol used, the reaction temperature, and the reaction time.

After the completion of the reaction, the maleimide-maleic acid copolymer may be easily recovered from the reaction solution by, e.g., the deposition of the maleimide-maleic acid copolymer using an inactive solvent such as water and ethers.

The maleimide-maleic acid copolymer obtained in the aforementioned manner may be solubilized in water by, e.g., hydrolyzing or neutralizing the maleic acid units in the maleimide-maleic acid copolymer. Specific examples therefor may include (1) a method wherein the maleic anhydride units in the maleimide-maleic acid copolymer are hydrolyzed at high temperatures (80° C. or higher and 100° C. or lower); and (2) a method wherein the maleic acid units in the maleimide-maleic acid copolymer are neutralized with a neutralizer. In the method (1), it is preferable to add a neutralizer upon hydrolysis. In the method (2), the temperature at which the neutralizer is added is not particularly limited, and may be a room temperature.

Examples of the neutralizer may include alkali metal hydroxides such as lithium hydroxide, sodium hydroxide, and potassium hydroxide; alkali earth metal hydrooxides such as calcium hydroxide, magnesium hydroxide, and barium hydroxide; hydroxides such as hydroxides of metals belonging to group IIIA in the long periodic table such as aluminum hydroxide; alkali metal carbonates such as sodium carbonate and potassium carbonate; carbonates such as alkaline earth metal carbonates such as magnesium carbonate; and organic amines. Examples of the organic amine may include alkylamines such as ethylamine, diethylamine, and propylamine; alcoholamines such as monomethanolamine, monoethanolamine, and monopropanolamine; and ammonias such as ammonia. Of these, the organic amines that may generate sodium ions, lithium ions, and ammonium ions are preferred in terms of high solubility in water, and those that may generate sodium ions are particularly preferred. One type of the neutralizer may be used alone, or two or more types thereof may be used in combination at any ratio.

[3.3. Binder]

It is preferable that the porous membrane contains a binder. By containing the binder, the binding property of the porous membrane is increased to improve the strength against the mechanical force which is applied to the porous membrane separator while the porous membrane separator is handled during, e.g., winding and transporting.

A variety of polymer components may be used as the binder. Examples of the polymer component may include styrene-butadiene copolymers (SBR), acrylonitrile-butadiene copolymers (NBR), hydrogenated SBRs, hydrogenated NBRs, styrene-isoprene-styrene block copolymers (SIS), and acrylic polymers. Of these, acrylic polymers are preferred as the binder, and the copolymer of (meth)acrylic acid ester monomer and (meth)acrylonitrile monomer is particularly preferred.

Examples of the (meth)acrylic acid ester monomer may include the compound represented by $CH_2=CR^5-COOR^6$. In this formula, $R^5$ represents a hydrogen atom or a methyl group, and $R^6$ represents an alkyl group or a cycloalkyl group.

Examples of the (meth)acrylic acid ester monomer may include acrylates such as methyl acrylate, ethyl acrylate, n-propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, 2-methoxyethyl acrylate, 2-ethoxyethyl acrylate, hexyl acrylate, nonyl acrylate, lauryl acrylate, stearyl acrylate, and benzyl acrylate; and methacrylates such as methyl methacrylate, ethyl methacrylate, propyl methacrylate, isopropyl methacrylate, n-butyl methacrylate, isobutyl methacrylate t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, stearyl methacrylate, and benzyl methacrylate. Of these, acrylates are preferred, and n-butyl acrylate and 2-ethylhexyl acrylate are particularly preferred in terms of their ability to improve strength of the porous membrane. One type of these monomers may be used alone, or two or more types thereof may be used in combination at any ratio.

One type of the (meth)acrylonitrile monomer unit may be used alone, or two or more types thereof may be used in combination at any ratio.

The polymerization ratio of the (meth)acrylonitrile monomers with respect to the (meth)acrylic acid ester monomers, i.e. ((meth)acrylonitrile monomers/(meth)acrylic acid ester monomers), is preferably 1/99 or more and more preferably 5/95 or more, and preferably 30/70 or less and more preferably 25/75 or less. By setting the polymerization ratio of the (meth)acrylonitrile monomers with respect to the (meth) acrylic acid ester monomers to a ratio equal to or more than the lower limit of the aforementioned range, swelling property of the binder with the electrolyte solution can be suppressed, to prevent a decrease in ion conductivity. By setting the polymerization ratio to equal to or less than the upper limit, strength of the binder can be increased, to increase the strength of the porous membrane separator.

If necessary, the aforementioned copolymer of the (meth) acrylic acid ester monomer and the (meth)acrylonitrile monomer may further include optional copolymer components other than the (meth)acrylic acid ester monomer and the (meth)acrylonitrile monomer. Examples of the structural units corresponding to such copolymer components may include structural units having a structure formed by polymerization of vinyl monomers having an acidic group(s), and crosslinkable monomer units.

Examples of the vinyl monomer having an acidic group(s) may include monomers having a —COOH group(s) (carboxylic acid group), monomers having an —OH group(s) (hydroxyl group), monomers having a —SO$_3$H group (sulfonate group), monomers having a —PO$_3$H$_2$ group, monomers having a —PO(OH)(OR) group (R represents a hydrocarbon group), and monomers having a lower polyoxyalkylene group. In addition, acid anhydrides that generate a carboxylic acid group through hydrolysis may be used as well.

Examples of the monomer having a carboxylic acid(s) group may include monocarboxylic acids, dicarboxylic acids, anhydrides of dicarboxylic acids, and derivatives thereof. Examples of the monocarboxylic acid may include acrylic acid, methacrylic acid, crotonic acid, 2-ethylacrylic acid, and isocrotonic acid. Examples of the dicarboxylic acid may include maleic acid, fumaric acid, itaconic acid, and methylmaleic acid. Examples of the anhydrides of the dicarboxylic acids may include maleic anhydride, acrylic anhydride, methylmaleic anhydride, and dimethylmaleic anhydride.

Examples of the monomer having a hydroxy group(s) may include ethylenically unsaturated alcohols such as (meth)allyl alcohol, 3-buten-1-ol, and 5-hexen-1-ol; alkanol esters of ethylenically unsaturated carboxylic acid such as 2-hydroxyethyl acrylate, 2-hydroxypropyl acrylate, and 2-hydroxyethyl methacrylate; esters of polyalkylene glycol and (meth)acrylic acid represented by a general formula of $CH_2=CR^7-COO-(C_nH_{2n}O)_m-H$ (m represents an integer from 2 to 9, n represents an integer from 2 to 4, and $R^7$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)ally-2-hydroxyethyl ether, (meth)allyl-2-hydroxypropyl ether, and (meth)allyl-3-hydroxypropyl ether; polyoxyalkylene glycol mono(meth)allyl ethers such as diethylene glycol mono(meth)allyl ether and dipropylene glycol mono(meth)allyl ether; mono(meth)allyl ethers of halogenated and hydroxylated products of (poly)alkylene glycols such as glycerol mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogenated products thereof; and (meth)allyl thioethers of alkylene glycols such as (meth)allyl-2-hydroxyethyl thioether and (meth)allyl-2-hydroxypropyl thioether.

Examples of the monomer having a sulfonate group may include vinylsulfonic acid, methylvinylsulfonic acid, (meth) allylsulfonic acid, styrenesulfonic acid, 2-sulfoethyl (meth) acrylate, 2-acrylamide-2-methylpropanesulfonic acid, and 3-allyloxy-2-hydroxypropanesulfonic acid.

Examples of the monomer having a —PO$_3$H$_2$ group and/or a —PO(OH)(OR) group (R represents a hydrocarbon group) may include 2-(meth)acryloyloxyethyl phosphate, methyl 2-(meth)acryloyloxyethyl phosphate, and ethyl (meth)acryloyloxyethyl phosphate.

Examples of the monomer having a lower polyoxyalkylene group may include poly(alkylene oxides) such as poly (ethylene oxide).

Of these, the monomers having a carboxylic acid group(s) are preferred as the vinyl monomer having an acidic group(s) because they have excellent adhesion to the organic separator and efficiently capture transition metal ions dissolved from a positive electrode active material. In particular, monocarboxylic acids of 5 or less carbon atoms having a carboxylic acid group such as acrylic acid and methacrylic acid, and dicarboxylic acids of 5 or less carbon atoms having two carboxylic acid groups such as maleic acid and itaconic acid are preferred. Furthermore, acrylic acid, methacrylic acid, and itaconic acid are preferred in view of high preservation stability of the produced slurry.

The content ratio of the structural units having a structure formed by polymerization of vinyl monomers having an acidic group(s) in the copolymer of the (meth)acrylic acid ester monomer and the (meth)acrylonitrile monomer is preferably 1.0% by weight or more and more preferably 1.5% by weight or more, and preferably 3.0% by weight or less and more preferably 2.5% by weight or less.

The crosslinkable monomer unit is a structural unit obtained by polymerization of crosslikable monomers. The crosslikable monomers are monomers that are capable of forming a crosslinked structure during polymerization or after polymerization by heating or energy-ray irradiation. Examples of the crosslikable monomer usually may include monomers having thermal crosslinkability. Specific examples of the crosslikable monomer may include monofunctional crosslikable monomers having a thermally-crosslinkable crosslinking group and one olefinic double bond per molecule; and polyfunctional crosslikable monomers having two or more olefinic double bonds per molecule.

Examples of the thermally-crosslinkable crosslinking group may include an epoxy group, an N-methylolamido group, an oxetanyl group, an oxazoline group, and combinations thereof. Of these, an epoxy group is more preferred in terms of easy control of crosslinking and crosslinking density.

Examples of the crosslikable monomers having an olefinic double bond and an epoxy group as the thermally-crosslinkable crosslinking group may include unsaturated glycidyl ethers such as vinyl glycidyl ether, allyl glycidyl ether, butenyl glycidyl ether, and o-allylphenyl glycidyl ether; monoepoxides of dienes or polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of the crosslikable monomers having an olefinic double bond and an N-methylolamido group as the thermally-crosslinkable crosslinking group may include (meth)acrylamides having a methylol group such as N-methylol(meth)acrylamide.

Examples of the crosslikable monomers having an olefinic double bond and an oxetanyl group as the thermally-crosslinkable crosslinking group may include 3-((meth)acryloyl oxymethyl)oxetane, 3-((meth)acryloyl oxymethyl)-2-trifluoromethyl oxetane, 3-((meth)acryloyl oxymethyl)-2-phenyl oxetane, 2-((meth)acryloyl oxymethyl)oxetane, and 2-((meth)acryloyl oxymethyl)-4-trifluoromethyl oxetane.

Examples of the crosslikable monomers having an olefinic double bond and an oxazoline group as the thermally-crosslinkable crosslinking group may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the crosslikable monomer having two or more olefinic double bonds per molecule may include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyloxyethane, trimethylolpropane-diallyl ether, other allyl or vinyl ethers of polyfunctional alcohols, triallylamine, methylenebisacrylamide, and divinylbenzene.

Of these, ethylene dimethacrylate, allyl glycidyl ether, and glycidyl methacrylate are particularly preferred as the crosslikable monomer.

One type of the crosslikable monomer may be used alone, or two or more types thereof may be used in combination at any ratio.

The content ratio of the crosslinkable monomer units in the copolymer of the (meth)acrylic acid ester monomer and the (meth)acrylonitrile monomer is preferably 0.1% by weight or more, and preferably 10% by weight or less and more preferably 5% by weight or less. By setting the content ratio of the crosslinkable monomer units in the aforementioned range, deformation of the layers due to the dissolving of the polymer into the electrolyte solution can be prevented, to improve the cycle property of the secondary battery.

One type of the binder may be used alone, or two or more types thereof may be used in combination at any ratio.

The weight-average molecular weight of the polymer forming the binder is preferably 10,000 or more and more preferably 20,000 or more, and preferably, 1,000,000 or less and more preferably 500,000 or less. When the weight-average molecular weight of the polymer forming the binder is in the aforementioned range, high strength of the porous membrane separator and favorable dispersibility of the non-conductive particles can be easily realized.

The glass transition temperature of the binder is preferably $-60°$ C. or higher, more preferably $-55°$ C. or higher, and particularly preferably $-50°$ C. or higher, and usually $20°$ C. or lower, preferably $15°$ C. or less and more preferably $5°$ C. or lower. When the glass transition temperature of the binder is equal to or more than the lower limit of the aforementioned range, strength of the binder can be increased, and strength of the porous membrane can be improved. When the glass transition temperature is equal to or less than the upper limit, flexibility of the porous membrane separator can be increased.

As the binder, it is preferable to use a particulate binder. When the particulate binder is used, the binder binds to the non-conductive particles at points rather than on a plane. This can increase voids between the non-conductive particles to increase the void ratio of the porous membrane. In this case, the binder is usually particles of water-insoluble polymer.

When the binder is in a form of particles, the volume average particle diameter D50 of the particulate binder is preferably 50 nm or more and more preferably 70 nm or more, and preferably 500 nm or less and more preferably 400 nm or less. When the number average particle diameter D50 of the particulate binder is in the aforementioned range, favorable strength and flexibility of the obtained porous membrane separator can be obtained.

The amount of the binder is preferably 0.1 parts by weight or more, more preferably 0.2 parts by weight or more, and particularly preferably 0.5 parts by weight or more, and preferably 20 parts by weight or less, more preferably 15 parts by weight or less, and particularly preferably 10 parts by weight or less, relative to 100 parts by weight of the non-conductive particles. By setting the amount of the binder to an amount equal to or more than the lower limit of the aforementioned range, binding property between the separator substrate and the porous membrane can be increased. By setting the amount of the binder to an amount equal to or less than the upper limit, decrease in ion conductivity due to the porous membrane separator can be prevented.

The method for producing the binder is not particularly limited, and any methods such as a solution polymerization method, a suspension polymerization method, and an emulsion polymerization method may be used. Of these, the emulsion polymerization method and the suspension polymerization method are preferred because polymerization can be carried out in water and the product as it is can be used as a material of the porous membrane slurry. In the production of the binder, the reaction system preferably contains a dispersant.

[3.4. Optional Components]

If necessary, the porous membrane may contain other optional components in addition to the aforementioned components. As such optional components, those that have no effect on the battery reactions may be used. Examples of these components may include isothiazoline compounds, chelate compounds, pyrithione compounds, dispersants, leveling agents, antioxidants, thickeners, and defoamers. Examples thereof may also include electrolytic additives having a function of inhibiting electrolyte solution decomposition or other functions. One type of these components may be used alone, or two or more types thereof may be used in combination at any ratio.

[3.5. Properties and Thickness of Porous Membrane]

Since the voids between the non-conductive particles form pores in the porous membrane, the porous membrane has a porous structure. This allows the porous membrane to have liquid permeability, so that the porous membrane does not inhibit ion movement. Therefore, the porous membrane does not inhibit the battery reactions in the secondary battery. Further, since the non-conductive particles do not have conductivity, the porous membrane can express insulation.

Further, since the porous membrane according to the present invention contains the non-conductive particles that has low tendency to cause thermal deformation and also has the maleimide-maleic acid copolymer having high thermal resistance, the porous membrane has low tendency to cause heat shrinkage. In the porous membrane separator including the porous membrane that has such low tendency to cause heat shrinkage, the porous membrane resists to the shrinkage stress even when the shrinkage stress is generated in the separator substrate, so that the porous membrane separator has low tendency to cause heat shrinkage. Therefore, the battery having the porous membrane separator has a significantly lower risk of short circuit and thus enables greatly improved safety.

Further, since the maleimide-maleic acid copolymer is used, the water content in the porous membrane can be reduced. Therefore, electrolyte solution decomposition caused by the residual water can be prevented in the secondary battery.

The thickness of the porous membrane is preferably 0.1 µm or more, more preferably 0.2 µm or more, and particularly preferably 0.3 µm or more, and preferably 20 µm or less, more preferably 15 µm or less, and particularly preferably 10 µm or less. By setting the thickness of the porous membrane to equal to or more than the lower limit of the aforementioned range, thermal resistance of the porous membrane can be increased. By setting the thickness to equal to or less than the upper limit, decrease in ion conductivity due to the porous membrane can be prevented.

[3.6. Method for Producing Porous Membrane]

The porous membrane may be formed by, e.g., applying the porous membrane slurry onto at least one surface of the separator substrate, followed by drying.

The porous membrane slurry contains the non-conductive particles, the maleimide-maleic acid copolymer, and if necessary, the binder and optional components. The porous membrane slurry usually contains a solvent. As the solvent, e.g., water is used.

In the porous membrane slurry, the non-conductive particles are dispersed in water, and the maleimide-maleic acid copolymer is dissolved in water. In the porous membrane slurry, part of the maleimide-maleic acid copolymer is usually liberated in water, while another part of the copolymer adsorbs to the surface of the non-conductive particles, so that the non-conductive particles are covered with a stable layer of the maleimide-maleic acid copolymer to improve the dispersibility of the non-conductive particles in water. This improves the coating property of the porous membrane slurry when this slurry is applied onto the separator substrate. When the porous membrane slurry contains a binder, the binder may be dissolved or dispersed in water.

The porous membrane slurry is obtained by, e.g., mixing the non-conductive particles, the maleimide-maleic acid copolymer, the solvent and, if necessary, the binder and optional components. Upon mixing, these components may be simultaneously supplied into a mixer and mixed. Alternatively, these components may be mixed in separate steps in any order. As the mixer, e.g., a ball mill, a sand mill, a pigment disperser, a grinding machine, an ultrasonic disperser, a homogenizer, a planetary mixer, a Hobart mixer, and others may be used.

After the porous membrane slurry is prepared, the porous membrane slurry is applied onto the separator substrate. This forms a layer of the porous membrane slurry on the separator substrate. There is no limitation on the coating method of the porous membrane slurry. Examples of the coating method may include a doctor blade method, a dip method, a die coating method, a reverse roll method, a direct roll method, a gravure method, an extrusion method, and a brush coating method. The coating amount of the porous membrane slurry is usually within the range that provides the porous membrane with a desired thickness.

After the layer of the porous membrane slurry is formed on the separator substrate, the layer is dried. This drying removes a solvent from the layer of the porous membrane slurry to form a porous membrane. Examples of the drying method may include drying with air such as warm air, hot air, and low humid air, vacuum drying, and drying methods by irradiation with energy rays such as infrared rays, far infrared rays, and electron beams.

The drying temperature is preferably 40° C. or higher, more preferably 45° C. or higher, and particularly preferably 50° C. or higher, and preferably 90° C. or lower, more preferably 80° C. or lower, and particularly preferably 70° C. or lower. By setting the drying temperature to equal to or more than the lower limit of the aforementioned range, water and low molecular compounds can be efficiently removed from the porous membrane slurry. By setting the drying temperature to equal to or less than the upper limit, coating can be carried out with suppressed heat shrinkage of the separator substrate.

The drying time is preferably 5 seconds or longer, more preferably 10 seconds or longer, and particularly preferably 15 seconds or longer, and preferably 3 minutes or shorter, more preferably 2 minutes or shorter, and particularly preferably 1 minute or shorter. By setting the drying time to equal to or more than the lower limit of the aforementioned range, sufficient removal of water from the porous membrane can be achieved, to improve the output property of the battery. By setting the drying time to equal to or less than the upper limit, production efficiency can be increased.

In the production of the porous membrane, optional procedures may be carried out in addition to the aforementioned procedures. For example, the porous membrane may be subjected to press treatment by a pressing method such as mold press and roll press. By performing the press treatment, binding property between the separator substrate and the porous membrane can be improved. Since excessive press treatment may reduce the void ratio of the porous membrane, it is preferable that the pressure and pressing time are appropriately controlled. In addition, it is preferable that the porous membrane is dried by vacuum drying or in a dry room to remove residual water. Heat treatment is also preferred, whereby the thermally crosslinkable groups in the binder form crosslinks to improve the binding strength.

[4. Adhesive Layer]

The porous membrane separator of the present invention includes an adhesive layer on the porous membrane. The adhesive layer is a layer containing a particulate polymer.

[4.1. Particulate Polymer]

As the particulate polymer, a particulate polymer having a glass transition temperature of usually 10° C. or higher, preferably 30° C. or higher, and more preferably 40° C. or higher, and usually 110° C. or lower, preferably 100° C. or lower, and more preferably 90° C. or lower is used. When the glass transition temperature of the particulate polymer is equal to or more than the lower limit of the aforementioned range, softening of the particulate polymer when the porous membrane separator is stored, transported, and handled can be suppressed, whereby blocking can be prevented. Use of the particulate polymer having a high glass transition temperature improves the thermal resistance of the adhesive layer. The improved thermal resistance can prevent separation of the porous membrane separator even when the temperature of the secondary battery increases during the use of the secondary battery, whereby battery safety can be increased. When the glass transition temperature is equal to or less than the upper limit, the particulate polymer can easily be softened by heat when the porous membrane separator is attached to the electrode. In addition, that enables heat fusion of the adhesive layer at a low temperature that does not give damages to the components of the battery such as the separator substrate. Therefore, bonding between the porous membrane separator and the electrode by heat pressing can be easily performed.

As the particulate polymer, a variety of polymers having glass transition temperatures in the aforementioned range may be used.

Among them, it is preferable that the particulate polymer is a polymer including structural units having a structure formed by polymerization of acrylic acid ester monomers (this structural unit may be appropriately referred to hereinbelow as "acrylic acid ester monomer unit").

Examples of the acrylic acid ester monomer may include alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate. Only one type of the acrylic acid ester monomer may be used alone, or two or more types thereof may be used in combination at any ratio.

The ratio of the acrylic acid ester monomers with respect to the total monomers of the particulate polymer is usually 1% by weight or more, preferably 5% by weight or more, and more preferably 10% by weight or more, and usually 95% by weight or less, preferably 90% by weight or less, and more preferably 85% by weight or less. By setting the ratio of the acrylic acid ester monomers to a ratio equal to or more than the lower limit of the aforementioned range, binding property between the adhesive layer and the porous membrane can be increased. By setting the ratio of the acrylic acid ester monomers to a ratio equal to or less than the upper limit, swelling property of the adhesive layer with the electrolyte solution can be suppressed, to increase the ion conductivity of the porous membrane separator. The ratio of the acrylic acid ester monomers with respect to the total monomers of the particulate polymer usually corresponds to the ratio of the acrylic acid ester monomer units in the particulate polymer.

It is preferable that the particulate polymer is a polymer including structural units having a structure formed by polymerization of ethylenically unsaturated carboxylic acid monomers (this unit may be appropriately referred to hereinbelow as "ethylenically unsaturated carboxylic acid monomer unit").

Examples of the ethylenically unsaturated carboxylic acid monomer may include ethylenically unsaturated monocarboxylic acids, ethylenically unsaturated dicarboxylic acids, and acid anhydrides thereof. Examples of the ethylenically unsaturated monocarboxylic acid may include acrylic acid, methacrylic acid, and crotonic acid. Examples of the ethylenically unsaturated dicarboxylic acid may include maleic acid, fumaric acid, and itaconic acid. Examples of the acid anhydrides of ethylenically unsaturated dicarboxylic acid may include maleic anhydride, acrylic acid anhydride, methyl maleic anhydride, and dimethyl maleic anhydride. Of these, ethylenically unsaturated monocarboxylic acids, such as acrylic acid and methacrylic acid, are preferred in terms of increased dispersibility of the particulate polymer in water. One type of them may be used alone, or two or more types thereof may be used in combination at any ratio.

The ratio of the ethylenically unsaturated carboxylic acid monomers with respect to the total monomers of the particulate polymer is usually 0.1% by weight or more, preferably 0.5% by weight or more, and more preferably 1% by weight or more, and usually 95% by weight or less, preferably 90% by weight or less, and more preferably 85% by weight or less. By setting the ratio of the ethylenically unsaturated carboxylic acid monomers to a ratio equal to or more than the lower limit of the aforementioned range, blocking resistance of the porous membrane separator can be increased. By setting the ratio to equal to or less than the upper limit, adhesive strength between the porous membrane separator and the electrode can be increased. The ratio of the ethylenically unsaturated carboxylic acid monomers with respect to the total monomers of the particulate polymer usually corresponds to the ratio of the ethylenically unsaturated carboxylic acid monomer units in the particulate polymer.

Furthermore, it is preferable that the particulate polymer is a polymer including structural units having a structure formed by polymerization of aromatic vinyl monomers (this unit may be appropriately referred to hereinbelow as "aromatic vinyl monomer unit").

Examples of the aromatic vinyl monomer may include styrene, α-methylstyrene, vinyltoluene, and divinylbenzene. Of these, styrene is preferred. One type of them may be used alone, or two or more types thereof may be used in combination at any ratio.

The ratio of the aromatic vinyl monomers with respect to the total monomers of the particulate polymer is usually 0.1% by weight or more, preferably 0.5% by weight or more, and more preferably 1% by weight or more, and usually 95% by weight or less, preferably 90% by weight or less, and more preferably 85% by weight or less. By setting the ratio of the aromatic vinyl monomers to a ratio equal to or more than the lower limit of the aforementioned range, blocking resistance of the porous membrane separator can be increased. By setting the ratio to equal to or less than the upper limit, adhesive strength between the porous membrane separator and the electrode can be increased. The ratio of the aromatic vinyl monomers with respect to the total monomers of the particulate polymer usually corresponds to the ratio of the aromatic vinyl monomer units in the particulate polymer.

It is preferable that the particulate polymer is a polymer including structural units having a structure formed by polymerization of (meth)acrylonitrile monomers (this unit may be appropriately referred to hereinbelow as "(meth)acrylonitrile monomer unit").

As the (meth)acrylonitrile monomer, only acrylonitrile may be used; only methacrylonitrile may be used; and a combination of acrylonitrile and methacrylonitrile at any ratio may also be used.

The ratio of the (meth)acrylonitrile monomers with respect to the total monomers of the particulate polymer is usually 0.1% by weight or more, preferably 0.5% by weight or more, and more preferably 1% by weight or more, and usually 95% by weight or less, preferably 90% by weight or less, and more preferably 85% by weight or less. By setting the ratio of the (meth)acrylonitrile monomers to equal to or more than the lower limit of the aforementioned range, adhesive strength between the porous membrane separator and the electrode can be increased. By setting the ratio to equal to or less than the upper limit, binding property between the adhesive layer and the porous membrane can be increased. The ratio of the (meth)acrylonitrile monomers with respect to the total monomers of the particulate polymer usually corresponds to the ratio of the (meth)acrylonitrile monomer units in the particulate polymer.

It is preferable that the particulate polymer is a polymer including structural units having a crosslinkable group (i.e., crosslinkable monomer units). For this reason, the crosslikable monomer is preferably used as the monomer of the particulate polymer. The crosslikable monomer used herein means a monomer that is capable of forming a crosslinked structure during polymerization or after polymerization by heating.

Examples of the crosslikable monomer may include monomers having thermal crosslinkability. Specific examples of the crosslikable monomer may include monofunctional monomers having a thermally-crosslinkable crosslinking group and one olefinic double bond per molecule; and polyfunctional monomers having two or more olefinic double bonds per molecule.

Examples of the thermally-crosslinkable crosslinking group may include an epoxy group, an N-methylolamido group, an oxetanyl group, an oxazoline group, and combinations thereof. Of these, an epoxy group is more preferred in terms of easy control of crosslinking and crosslinking density.

Examples of the crosslikable monomers having an olefinic double bond and an epoxy group as the thermally-crosslinkable crosslinking group may include unsaturated glycidyl ethers such as vinyl glycidyl ether, allyl glycidyl ether, butenyl glycidyl ether, and o-allylphenyl glycidyl ether; monoepoxides of dienes or polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of the crosslikable monomers having an olefinic double bond and an N-methylolamido group as the thermally-crosslinkable crosslinking group may include (meth)acrylamides having a methylol group such as N-methylol(meth)acrylamide.

Examples of the crosslikable monomers having an olefinic double bond and an oxetanyl group as the thermally-crosslinkable crosslinking group may include 3-((meth)acryloyloxymethyl)oxetane, 3-((meth)acryloyloxymethyl)-2-trifluoromethyl oxetane, 3-((meth)acryloyloxymethyl)-2-phenyl oxetane, 2-((meth)acryloyloxymethyl)oxetane, and 2-((meth)acryloyloxymethyl)-4-trifluoromethyl oxetane.

Examples of the crosslikable monomers having an olefinic double bond and an oxazoline group as the thermally-crosslinkable crosslinking group may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the crosslikable monomer having two or more olefinic double bonds per molecule may include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyloxyethane, trimethylolpropane-diallyl ether, other allyl or vinyl ethers of polyfunctional alcohols, triallylamine, methylenebisacrylamide, and divinylbenzene.

Of these examples, ethylene dimethacrylate, allyl glycidyl ether, and glycidyl methacrylate are particularly preferred as the crosslikable monomer.

One type of the crosslikable monomer may be used alone, or two or more types thereof may be used in combination at any ratio.

The ratio of the crosslikable monomers with respect to the total monomers of the particulate polymer is usually 0.01% by weight or more, preferably 0.05% by weight or more, and more preferably 0.1% by weight or more, and usually 5% by weight or less, preferably 3% by weight or less, and more preferably 2% by weight or less. By setting the ratio of the crosslikable monomers to a ratio equal to or more than the lower limit of the aforementioned range, strength of the porous membrane can be increased. Further, swelling of the porous membrane due to the electrolyte solution can be suppressed. By setting the ratio to equal to or less than the upper limit, flexibility of the porous membrane can be increased. The ratio of the crosslikable monomers with repsect to the total monomers of the particulate polymer usually corresponds to the ratio of the crosslinkable monomer units in the particulate polymer.

One type of the particulate polymer may be used alone, or two or more types thereof may be used in combination at any ratio.

The volume average particle diameter D50 of the particulate polymer is preferably 0.01 μm or more, more preferably 0.05 μm or more, and particularly preferably 0.1 μm or more, and preferably 1.0 μm or less, more preferably 0.8 μm or less, and particularly preferably 0.5 μm or less. When the volume average particle diameter D50 of the particulate polymer is equal to or more than the lower limit of the aforementioned range, an excessive increase in particle filling ratio in the porous membrane can be suppressed, which suppresses an decrease in ion conductivity in the porous membrane, to achieve excellent cycle property. When the volume average particle diameter D50 is equal to or less than the upper limit, control of the dispersion state of the porous membrane slurry can easily be achieved, which facilitates production of the porous membrane having a uniform predetermined thickness.

[4.2. Binder]

The adhesive layer may contain a binder. By containing the binder, the binding property of the adhesive layer to the porous membrane can be improved.

As the binder, e.g., the same binders as those described in the section of the porous membrane may be used. However, a polymer in particulate form having a glass transition temperature in the temperature range described in the section of the particulate polymer is not regarded as the binder but as the particulate polymer. In particular, a combination of a particulate binder having a glass transition temperature of −50° C. or higher and lower than 10° C. and a particulate polymer having a glass transition temperature of 10° C. or higher and 110° C. or lower is preferable since thereby removal of the particulate polymer from the adhesive layer can be stably prevented.

The amount of the binder in the adhesive layer is preferably 0.1 parts by weight or more, more preferably 0.5 parts by weight or more, and particularly preferably 1 part by weight or more, and preferably 15 parts by weight or less, more preferably 10 parts by weight or less, and particularly preferably 4 parts by weight or less, relative to 100 parts by weight of the particulate polymer. By setting the amount of the binder to an amount equal to or more than the lower limit of the aforementioned range, binding strength between the particulate polymer particles can be improved, to prevent separation of the particulate polymer. By setting the amount of the binder to an amount equal to or less than the upper limit, decrease in ion conductivity of the adhesive layer can be suppressed, to achieve excellent cycle property.

[4.3. Other Components]

If necessary, the adhesive layer may contain other optional components in addition to the aforementioned components. As such optional components, those that have no effect on the battery reactions may be used. Examples of such components may include water-soluble polymers for viscosity control and precipitation prevention, and wetting agents for improving the wettability to the organic separator. One type of these components may be used alone, or two or more types thereof may be used in combination at any ratio.

[4.4. Properties, Thickness]

Since the voids between the particulate polymer particles form pores in the adhesive layer, the adhesive layer has a porous structure. This allows the adhesive layer to have liquid permeability, so that the adhesive layer does not inhibit ion movement. Therefore, the adhesive layer does not inhibit the battery reactions in the secondary battery. Further, since the particulate polymer do not have conductivity, the adhesive layer can express insulation.

In this adhesive layer, heating may be softened the particulate polymer. Thus, press-bonding under heating allows the adhesive layer to favorably adhere to another member such as the electrode. Therefore, the porous membrane separator including the adhesive layer can adhere to the electrode with high adhesive strength. Further, since the particulate polymer has a high glass transition temperature, the adhesive layer has high thermal resistance. Therefore, the porous membrane separator is hardly separated from the electrode even when the temperature of the secondary battery increases with charging and discharging. This can more stably prevent short circuit and thus can improve the safety.

Furthermore, the particulate polymer contained in the adhesive layer has low tendency to be softened in normal using environment of the porous membrane separator. Therefore, the porous membrane separator has excellent blocking resistance.

The thickness of the adhesive layer is preferably 0.1 μm or more, more preferably 0.2 μm or more, and particularly preferably 0.3 μm or more, and preferably 8.0 μm or less, more preferably 5.0 μm or less, and particularly preferably 3.0 μm or less. By setting the thickness of the adhesive layer to equal to or more than the lower limit of the aforementioned range, adhesion strength between the porous membrane separator and the electrode can be increased. By setting the thickness of the adhesive layer to equal to or less than the upper limit, ion conductivity of the porous membrane separator can be increased.

[4.5. Method for Producing Adhesive Layer]

The adhesive layer may be formed by, e.g., applying an adhesive layer slurry onto the porous membrane, followed by drying.

The adhesive layer slurry contains the particulate polymer and, if necessary, a binder and optional components. The adhesive layer slurry usually contains a solvent. As the solvent, e.g., water is used. Although the maleimide-maleic acid copolymer contained in the porous membrane is a water-soluble polymer, the copolymer has low tendency to be dissolved into the adhesive layer slurry when the adhesive layer slurry containing water is applied onto the porous membrane. Consequently, even when the adhesive layer is formed using the aqueous adhesive layer slurry, it is possible to obtain favorable binding property between the adhesive layer and the porous membrane and favorable binding property between the porous membrane and the separator substrate. In addition, water can be used as a solvent of the porous membrane slurry and the adhesive layer slurry, which is preferred because no cost for organic solvent recycling is required, nor safety ensuring for using organic solvents is required unlike when organic solvents are used.

In the adhesive layer slurry, the particulate polymer is dispersed in water. The binder may be dispersed or dissolved in water.

The adhesive layer slurry is obtained by, e.g., mixing the aforementioned particulate polymer and solvent, and if necessary, the binder and optional components. There is no particular limitation on mixing order. In addition, there is no particular limitation on mixing method.

After the adhesive layer slurry is prepared, the adhesive layer slurry is applied onto the porous membrane. This forms a layer of the adhesive layer slurry on the porous membrane. There is no limitation on the coating method of the adhesive layer slurry. Examples of the coating method may include a doctor blade method, a dip method, a die coating method, a reverse roll method, a direct roll method, a gravure method, an extrusion method, and a brush coating method. The coating amount of the adhesive layer slurry is usually within such a range that the adhesive layer having a desired thickness can be obtained.

After the layer of the adhesive layer slurry is formed on the porous membrane, the layer is dried. This drying removes the solvent from the layer of the adhesive layer slurry to form an adhesive layer. Examples of the drying method may include drying with air such as warm air, hot air, and low humid air, vacuum drying, and drying methods by irradiation with energy rays such as infrared rays, far infrared rays, and electron beams.

The drying temperature is preferably 40° C. or higher, more preferably 45° C. or higher, and particularly preferably 50° C. or higher, and preferably 80° C. or lower, more preferably 75° C. or lower, and particularly preferably 70° C. or lower. By setting the drying temperature to equal to or more than the lower limit of the aforementioned range, water can be efficiently removed from the adhesive layer slurry. By setting the drying temperature to equal to or less than the upper limit, coating can be carried out with suppressed heat shrinkage of the separator substrate.

The drying time is preferably 5 seconds or longer, more preferably 10 seconds or longer, and particularly preferably 15 seconds or longer, and preferably 3 minutes or shorter, more preferably 2 minutes or shorter, and particularly preferably 1 minute or shorter. By setting the drying time to equal to or longer than the lower limit of the aforementioned range, sufficient removal of water from the adhesive layer slurry can be achieved. By setting the drying time to equal to or shorter than the upper limit, heat shrinkage of the separator substrate can be suppressed.

In the production of the adhesive layer, optional procedures may be carried out in addition to the aforementioned procedures. For example, the adhesive layer may be dried by vacuum drying or in a dry room to remove residual water, or may be subjected to heat treatment.

[5. Other Matters Regarding Porous Membrane Separator]

The porous membrane separator produced by the method for producing the porous membrane separator of the present invention includes the separator substrate, the porous membrane, and the adhesive layer in this order. The porous membrane and the adhesive layer may be provided on only one of or both surfaces of the separator substrate. The porous membrane separator may include other components in addition to the separator substrate, the porous membrane, and the adhesive layer.

The porous membrane separator of the present invention includes a porous membrane that has excellent anti-heat-shrink ability. The porous membrane is strongly bound to the separator substrate. This strong binding allows the porous membrane to prevent the heat shrinkage of the separator substrate. Therefore, the porous membrane separator of the present invention has excellent anti-heatshrink ability.

The porous membrane containing the maleimide-maleic acid copolymer can be prepared with reduced water content. Consequently, in the secondary battery including the porous membrane separator of the present invention, decomposition of the electrolyte solution is suppressed, and therefore expansion of the secondary battery due to electrolyte solution decomposition is suppressed, thereby improving the cycle property.

The porous membrane separator of the present invention includes the adhesive layer containing the particulate polymer having a high glass transition temperature. In this adhesive layer, the particulate polymer is less likely to be softened in a using environment of the porous membrane separator, e.g., while the porous membrane separator is stored, transported, or handled. Therefore, the porous membrane separator of the present invention has excellent blocking resistance.

A porous membrane separator is often bound to the electrode and used as a laminate for secondary batteries. In this case, the adhesive layer of the porous membrane separator is bonded to the electrode active material layer of the electrode. The particulate polymer in the adhesive layer, which has a suitable glass transition temperature, is capable of being softened by heating. Therefore, the press-bonding under heating of the porous membrane separator of the present invention can realize adhesion of the separator to the electrode with high adhesive strength.

In the press-bonding between the electrode and the porous membrane separator, the electrode and the porous membrane are usually stacked so that the electrode active material layer of the electrode faces the adhesive layer of the porous membrane separator, followed by the press-bonding.

The pressure applied during the bonding is usually 0.01 MPa or more, preferably 0.05 MPa or more, and more preferably 0.1 MPa or more, and usually 2 MPa or less, preferably 1.5 MPa or less, and more preferably 1 MPa or less. By setting the pressure to equal to or more than the lower limit of the aforementioned range, sufficient adhesion between the electrode plate and the adhesive layer can be achieved. By setting the pressure to equal to or less than the upper limit, breakage of the separator during the bonding can be prevented.

During the bonding, the porous membrane separator is usually heated. The specific temperature for bonding is usually equal to or higher than the glass transition temperature of the particulate polymer contained in the adhesive layer of the porous membrane separator, preferably 40° C. or higher, more preferably 50° C. or higher, and particularly preferably 60° C. or higher, and preferably 100° C. or lower, more preferably 95° C. or lower, and particularly preferably 90° C. or lower. By setting the temperature to equal to or more than the lower limit of the aforementioned range, strong adhesion between the electrode and the porous membrane separator can be achieved. By setting the temperature to equal to or less than the upper limit, thermal deterioration of the components of the electrode can be prevented.

The time period for applying the pressure and heat is preferably 0.5 seconds or longer, more preferably 1 second or longer, and particularly preferably 2 seconds or longer, and preferably 30 seconds or shorter, more preferably 20 seconds or shorter, and particularly preferably 10 seconds or shorter. By setting the time period for applying the pressure and heat to a time period equal to or more than the lower limit of the aforementioned range, strong adhesion between the electrode and the porous membrane separator can be achieved. By setting the time period to equal to or less than the upper limit, breakage of the separator during the bonding can be prevented.

The aforementioned press-bonding provides a laminate including the electrode(s) and the porous membrane separator. In this case, the electrode may be bonded to only one surface of the porous membrane separator. Alternatively, the electrodes may be bonded to both surfaces. For example, when the porous membrane separator including the porous membranes and the adhesive layers on both surfaces of the separator substrate is used, the laminate to be produced may be the one including the positive electrode, the porous membrane separator, and a negative electrode in this order.

[6. Battery]

The secondary battery of the present invention includes a positive electrode, the porous membrane separator of the present invention, and a negative electrode in this order, and further includes an electrolyte solution. As including the porous membrane separator of the present invention, the secondary battery of the present invention has high safety. Further, the secondary battery of the present invention also has high adhesion of the adhesive layer in the electrolyte solution and excellent electrical properties such as cycle property.

[6.1. Positive Electrode and Negative Electrode]

Each of electrodes as both positive and negative electrodes usually includes a current collector and an electrode active material layer provided on the current collector.

As the current collector, a material having electrical conductivity and electrochemical durability may be used. In particular, e.g., metallic materials, such as iron, copper, aluminum, nickel, stainless steel, titanium, tantalum, gold, and platinum are preferred in view of having thermal resistance. Of these, aluminum is particularly preferred for positive electrodes, and copper is particularly preferred for negative electrodes.

The shape of the current collector is not particularly limited, but the current collector is preferably in a sheet shape with a thickness of 0.001 mm or more and 0.5 mm or less.

The current collector is preferably subjected to a preliminary surface roughening process before use for increasing the adhesive strength to the electrode active material layer. Examples of the surface roughening method may include mechanical polishing, electrolytic polishing, and chemical polishing. In the mechanical polishing, e.g., a coated abrasive having abrasive particles bonded thereto, a grinding stone, an emery wheel, and a wire brush having steel wires may be used.

For increasing the conductivity and the adhesive strength to the electrode active material layer, an intermediate layer may be formed on the surface of the current collector.

The electrode active material layer contains an electrode active material. In the following description, an electrode active material particularly for positive electrodes may be referred to as a "positive electrode active material", and an electrode active material for negative electrodes may be referred to as a "negative electrode active material" among electrode active materials. There are a variety of types of electrode active materials in conformity with the types of secondary batteries, and particularly electrode active materials for lithium-ion secondary batteries will be described. Electrode active materials, however, are not limited to the followings.

As the electrode active material, those to and from which lithium ions can be reversibly intercalated and disintercalated by application of electric potential in an electrolyte solution are used. For the electrode active material, any of inorganic compounds and organic compounds may be used.

The positive electrode active materials are roughly classified into materials made of inorganic compounds and materials made of organic compounds. Examples of the positive electrode active materials made of inorganic compounds may include transition metal oxides, complex oxides of lithium and transition metals, and transition metal sulfides. As the transition metals, e.g., Fe, Co, Ni, and Mn are used. Specific examples of the inorganic compounds used for the positive electrode active material may include lithium-containing complex metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_2$, and amorphous $MoS_2$; and transition metal oxides such as $Cu_2V_2O_3$, amorphous $V_2O$—$P_2O_5$, $MoO_3$, $V_2O_5$, and $V_6O_{13}$. On the other hand, examples of the positive electrode active materials made of organic compounds may include conductive polymers such as polyacetylene and poly-p-phenylene.

Furthermore, the positive electrode active material for use may be made of a composite material that is a combination of an inorganic compound and an organic compound.

For example, an iron-based oxide is subjected to reduction firing in the presence of a carbon source material to produce a composite material covered with the carbon material, and the composite material may be used as the positive electrode active material. The iron-based oxides tend to have low electrical conductivity. However, when an iron-based oxide is processed to be such a composite material, the composite material may be used as the positive electrode active material with high performance.

Furthermore, materials obtained by partial element substitution of the aforementioned compounds may also be used as the positive electrode active material.

Only one type of the positive electrode active material may be used alone, or two or more types thereof may be used in combination at any ratio. Moreover, mixtures of the aforementioned inorganic compounds and organic compounds may also be used as the positive electrode active material.

The particle diameter of the positive electrode active material is appropriately selected in accordance with other constituents for the secondary battery. From the viewpoint of improvements in battery property, such as load property and cycle property, the volume average particle diameter D50 of the positive electrode active material is usually 0.1 µm or more and preferably 1 µm or more, and usually 50 µm or less and preferably 20 µm or less. When the volume average particle diameter D50 of the positive electrode active material is in this range, a battery with large charging/discharging capacity can be obtained, and easy handling during the production of the active material layer slurry and the electrode can be realized.

Examples of the negative electrode active material may include carbonaceous materials such as amorphous carbon, graphite, natural graphite, mesocarbon microbeads, and pitch-based carbon fiber; and conductive polymers such as polyacene. Examples may also include metals such as silicon, tin, zinc, manganese, iron, and nickel, and alloys thereof; oxides of these metals and alloys; and sulfates of these metals and alloys. In addition, metal lithium; lithium alloys such as Li—Al, Li—Bi—Cd, and Li—Sn—Cd; lithium transition metal nitrides; silicon, and others may be used. Furthermore, an electrode active material in which a conductive material is attached to the surface by mechanical reforming may also be used. Only one type of the negative electrode active material may be used alone, or two or more types thereof may be used in combination at any ratio.

The particle diameter of the negative electrode active material is appropriately selected in accordance with other constituents for the secondary battery. From the viewpoint of improvements in battery property, such as initial efficiency, load property, and cycle property, the volume average particle diameter D50 of the negative electrode active material is usually 1 µm or more and preferably 15 µm or more, and usually 50 µm or less and preferably 30 µm or less.

It is preferable that the electrode active material layer contains a binder in addition to the electrode active material. By containing the binder, the binding property of the electrode active material layer in the electrode is improved to increase the strength against the mechanical force which is applied during, e.g., winding of the electrode. This prevents detachment of the electrode active material layer in the electrode to reduce a risk of short circuit or the like due to detached materials.

As the binder for the electrode active material layer, a variety of polymer components may be used. For example, polyethylene, polytetrafluoroethylene (PTFE), polyvinylidene fluoride (PVDF), tetrafluoroethylene-hexafluoropropylene copolymer (FEP), polyacrylic acid derivatives, polyacrylonitrile derivatives, and others may be used. The same binders as those described in the sections of the porous membrane and the adhesive layer of the porous membrane separator may also be used. One type of the binder may be used alone, or two or more types thereof may be used in combination at any ratio.

The amount of the binder in the electrode active material layer is preferably 0.1 parts by weight or more, more preferably 0.2 parts by weight or more, and particularly preferably 0.5 parts by weight or more, and preferably 5 parts by weight or less, more preferably 4 parts by weight or less, and particularly preferably 3 parts by weight or less, relative to 100 parts by weight of the electrode active material. When the amount of the binder is in the aforementioned range, removal of the electrode active material from the electrode can be prevented without inhibiting the battery reactions.

In addition to the electrode active material and the binder, the electrode active material layer may contain optional components unless the optional components significantly impair the effects of the present invention. Examples of the optional components may include conductive materials and reinforcing materials. One type of the optional component may be used alone, or two or more types thereof may be used in combination at any ratio.

Examples of the conductive material may include conductive carbons such as acetylene black, Ketjenblack, carbon black, graphite, vapor-grown carbon fiber, and carbon nanotube; carbon powders such as black lead; and fibers and foils of a variety of metals. Use of the conductive material can improve the electrical contact between the electrode active materials and can improve the cycle property particularly when the conductive material is used in lithium-ion secondary batteries.

As the reinforcing material, e.g., a variety of inorganic and organic spherical, plate-shaped, rod-shaped, or fibrous fillers may be used.

The amount of each of the conductive material used and the reinforcing material used is usually 0 part by weight or more and preferably 1 part by weight or more, and usually 20 parts by weight or less and preferably 10 parts by weight, relative to 100 parts by weight of the electrode active material.

The thickness of the electrode active material layer in each of the positive and negative electrodes is usually 5 µm or more and preferably 10 µm or more, and usually 300 µm or less and preferably 250 µm or less.

There is no particular limitation on the method for producing the electrode active material layer. The electrode active material layer may be produced by, e.g., applying onto the current collector the active material layer slurry containing the electrode active material, a solvent, and if necessary the binder and the optional components, followed by drying. As the solvent, any of water and organic solvents may be used.

[6.2. Electrolyte Solution]

As the electrolyte solution, e.g., a solution of a lithium salt as a supporting electrolyte in a non-aqueous solvent may be used. Examples of the lithium salt may include lithium salts such as $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$ are preferably used because they are easily dissolved in solvents to exhibit high dissociation degree. One type of them may be used alone, or two or more types thereof may be used in combination at any ratio.

The amount of the supporting electrolyte is usually 1% by weight or more and preferably 5% by weight or more, and usually 30% by weight or less and preferably 20% by weight or less relative to the electrolyte solution. When the amount of the supporting electrolyte is in this range, ion conductivity can be elevated to provide favorable charging property and discharging property of the secondary battery.

As the solvent for use in the electrolyte solution, solvents in which the supporting electrolyte can be dissolved may be used. Examples of the solvent for use may include alkyl carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulphur-containing compounds such as sulfolane and dimethyl sulfoxide. In particular, dimethyl carbonate, ethylene carbonate, propylene carbonate, diethyl carbonate, and methyl ethyl carbonate are preferred because high ion conductivity can be easily obatained and a wide operating temperature range is available. One type of the solvent may be used alone, or two or more types thereof may be used in combination at any ratio.

Further, the electrolyte solution may optionally contain an additive. As the additive, e.g., carbonate compounds, such as vinylene carbonate (VC), are preferred. One type of the additive may be used alone, or two or more types thereof may be used in combination at any ratio.

In addition, examples of the electrolyte solutions other than those described above may include gel polymer electrolytes obtained by impregnating polymer electrolytes such as polyethylene oxide and polyacrylonitrile, with the electrolyte solutions; and inorganic solid electrolytes such as lithium sulfide, LiI, and $Li_3N$.

[6.3. Production Method]

Examples of the method for producing a secondary battery may include a method in which electrodes, a porous membrane separator, and a laminate for secondary batteries are stacked in suitable combination as appropriate, then wound or folded in conformity with the battery shape, placed in a battery container, and an electrolyte solution is injected into a battery container, followed by sealing of the battery container. If necessary, overcharging/overdischarging and pressure increase inside the battery may be prevented by installing overcurrent protection elements such as a fuse and a PTC element, or a lead plate, expanded metal, or others. The shape of the battery may be any of a coin shape, a button shape, a sheet shape, a cylindrical shape, a square shape, and a flat shape.

EXAMPLES

The present invention will be described hereinbelow in detail by way of Examples. The present invention is not limited to following Examples and may be optionally modified and practiced without departing from the scope of the claims of the present invention and the scope of their equivalents.

Unless otherwise specified, "%" and "part" expressing the quantity in the following description are on the basis of weight. Unless otherwise specified, the procedures in the following description were carried out under the conditions of normal temperature and pressure.

An isobutylene unit refers to a structural unit having a structure formed by polymerization of isobutylene. A styrene unit refers to a structural unit having a structure formed by polymerization of styrene. Furthermore, an N-(4-hydroxyphenyl)maleimide unit refers to a structural unit having a structure formed by polymerization of N-(4-hydroxyphenyl)maleimide.

[Evaluation Method]

[Peel Strength]

A porous membrane separator is cut into a rectangle of 10 mm width×100 mm length, and a cellophane tape (specified in JIS 21522) is attached to the surface of the adhesive layer to produce a test piece. The cellophane tape of the test piece is then fixed to a test stand. Keeping this state, the porous membrane separator is peeled by vertically pulling the end thereof at a tensile speed of 50 mm/min, and the stress generated while peeling is measured. This measurement is repeated 3 times, and the average is obtained as the peel strength. The determined peel strength is evaluated in accordance with the following criteria. A larger peel strength is indicative of a larger binding strength between the porous membrane and the adhesive layer and a larger binding strength between the porous membrane and the organic separator, that is, a larger adhesion strength.

A: The peel strength is 100 N/m or more.

B: The peel strength is 75 N/m or more and less than 100 N/m.

C: The peel strength is 50 N/m or more and less than 75 N/m.

D: The peel strength is less than 50 N/m.

[Redissolution Rate of Maleimide-Maleic Acid Copolymer Film in Water]

An aqueous solution of maleimide-maleic acid copolymer is applied onto a 20 μm thick copper foil so that the dry thickness of the solution is 2 μm, and then the solution is dried at 120° C. for 10 minutes to form a film of maleimide-maleic acid copolymer. This provides the copper foil having the film of maleimide-maleic acid copolymer on the surface. This copper foil is cut into 1×1 cm² to produce a test piece. The weight M1 of this test piece is determined.

A copper foil with no film of maleimide-maleic acid copolymer is cut into the same size as the test piece, and the weight M0 thereof is then determined.

The test piece is immersed in ion exchange water at 25° C. for 1 hour. The test piece is then taken out of ion exchange water and dried at 120° C. for 10 minutes. After the test piece is dried, the weight M2 of the test piece is determined.

The redissolution rate ΔM is calculated from the determined weights M0, M1, and M2 in accordance with the following formula. A smaller redissolution rate ΔM is indicative of better shape keeping property.

$$\Delta M = (M1-M2)/(M1-M0) \times 100 (\%)$$

A: The redissolution rate is less than 5%.

B: The redissolution rate is 5% or more and less than 10.

C: The redissolution rate is 10% or more and less than 15%.

D: The redissolution rate is 15% or more.

[Heatshrink Ability]

A porous membrane separator is cut into a square of 5 cm width×5 cm length to produce a test piece. The test piece is placed in a thermostatic bath at 150° C. and left stand for 1 hour, and then the change in area of the square is determined as the heat shrinkage rate. A smaller heat shrinkage rate is indicative of better heatshrink ability of the porous membrane separator.

A: The heat shrinkage rate is less than 1%.

B: The heat shrinkage rate is 1% or more and less than 5%.

C: The heat shrinkage rate is 5% or more and less than 10%.

D: The heat shrinkage rate is 10% or more.

[Adhesion of Adhesive Layer in Electrolyte Solution]

A porous membrane separator is cut into a piece of 5 mm width×5 mm length, which is then stacked on a negative electrode (4 cm width×4 cm length) having an electrode active material layer, followed by pressing under the conditions of 90° C. and 0.5 MPa for 10 seconds, to prepare a laminate including the porous membrane separator and the negative electrode having the electrode active material layer. The prepared laminate is cut into a sample of 10 mm width. This sample is immersed in the same electrolyte solution as that used in the production of the battery at a temperature of 60° C. for 3 days. The sample is then taken out of the electrolyte solution, and the porous membrane separator is separated from the negative electrode in the wet conditions. The adhesion at this time is evaluated in accordance with the following criteria. Detection of a larger resistance when the porous membrane separator is separated from the electrode active material layer in the negative electrode is indicative of stronger adhesion retention properties of the adhesive layer in the electrolyte solution.

In the same manner as the aforementioned laminate including the porous membrane separator and the negative electrode, a laminate including a porous membrane separator and a positive electrode having an electrode active material layer is prepared. The adhesion of this laminate is also evaluated in the same manner as the laminate including the porous membrane separator and the negative electrode. When the result of the evaluation on the adhesion between the porous membrane separator and the positive electrode is the same as that of the evaluation on the adhesion between the porous membrane separator and the negative electrode, only the result of the evaluation on the adhesion between the porous membrane separator and the negative electrode is described.

A: The resistance is detected when the porous membrane separator is separated (good adhesion).

B: Little resistance is detected when the porous membrane separator is separated (poor adhesion).

C: The porous membrane separator is already separated when the laminate is taken out of the electrolyte solution.

[Blocking Resistance Test]

A porous membrane separator is cut into a square of 5 cm width×5 cm length and a square with 4 cm width×4 cm length to prepare test pieces. These two test pieces are stacked on each other. A sample of the stacked test pieces without being pressed (non-pressed sample) and a sample obtained by placing the stacked test pieces under a pressure of 10 g/cm² at a temperature of 40° C. (pressed sample) are left stand for 24 hours. After 24 hours of being left stand, the samples are visually observed to determine and evaluate the adhesion state (blocking state) of the stacked porous membrane separators in accordance with the following criteria. The blocking here refers to a phenomenon in which the stacked porous membrane separators adhere to each other.

A: No blocking occurs between the pressed porous membrane separators.

B: Blocking occurs between the pressed porous membrane separators although they are peelable.

C: Blocking occurs between the pressed porous membrane separators and they are not peelable.

D: Blocking occurs between the non-pressed porous membrane separators.

Example 1

[1-1. Production of Maleimide-Maleic Acid Copolymer]

In a reaction container equipped with a stirrer, 100 parts of an isobutylene-maleic anhydride copolymer a1 ("ISOBAM-04" produced by Kuraray Co., Ltd.) was placed. The reaction container was supplied with ammonia gas to perform the reaction for about 1 hour under cooling in a water bath until heat generation ceased. Subsequently ammonia gas was injected into the reaction container under heating in an oil bath, and generated water was distilled out of the system, while the temperature of the system was increased to 200° C. to perform imidization reaction. After the completion of the reaction, the reaction product was taken out and dried by heating to obtain a maleimide-maleic acid copolymer A1. The obtained maleimide-maleic acid copolymer A1 had a composition of 50 mol % isobutylene units, 18 mol % maleic anhydride units, 12 mol % maleic acid units, and 20 mol % maleimide units.

In a reaction container equipped with a stirrer, 100 parts of the obtained maleimide-maleic acid copolymer A1 and 540 parts of 25% aqueous ammonia were placed and stirred at 90° C. for 5 hours to obtain an aqueous solution of the maleimide-maleic acid copolymer A1 having a solid content concentration of 20%. The weight-average molecular weight of the maleimide-maleic acid copolymer A1 was 60,000.

The aqueous solution of the maleimide-maleic acid copolymer A1 thus obtained was used to determine the redissolution rate of the maleimide-maleic acid copolymer A1 in water.

(1-2. Production of Binder for Porous Membrane and Adhesive Layer)

To a reaction container equipped with a stirrer, 70 parts of ion exchange water, 0.15 parts of sodium lauryl sulfate (product name: "EMAL 2F", produced by Kao Chemicals) as an emulsifier, and 0.5 parts of ammonium persulfate are each supplied, and a gas phase portion was replaced with nitrogen gas, followed by heating to 60° C.

Meanwhile, in a separate container, 50 parts of ion exchange water, 0.5 parts of sodium dodecylbenzenesulfonate as a dispersant; and 94.8 parts of butyl acrylate, 2 parts of acrylonitrile, 1 part of methacrylic acid, 1.2 parts of N-methylolacrylamide, and 1 part of allyl glycidyl ether (AGE) as polymerizable monomers were mixed to obtain a monomer mixture. This monomer mixture was continuously added to the reaction container over 4 hours to perform polymerization. During the addition, the reaction was carried out at 60° C. After the completion of the addition, the monomer mixture was further stirred at 70° C. for 3 hours and then the reaction was finished to produce an aqueous dispersion containing an acrylic polymer as a binder for the porous membrane and the adhesive layer.

In the obtained acrylic polymer, the weight ratio represented by the "(meth)acrylonitrile monomer units/(meth) acrylic acid ester monomer units" was 2/94.8. The amount of the crosslinkable monomer units was 2.2 parts by weight (weight %) with respect to 100 parts by weight of the total amount of the (meth)acrylonitrile monomer units and the (meth)acrylic acid ester monomer units. The acrylic polymer had a volume average particle diameter of 360 nm and a glass transition temperature of −45° C.

(1-3. Production of Non-Conductive Particles)

In a reaction container equipped with a stirrer, 0.06 parts of sodium dodecyl sulfate, 0.23 parts of ammonium persulfate, and 100 parts of ion exchange water were placed and mixed to obtain mixture D. This mixture D was heated to 80° C.

Meanwhile, in a separate container, 93.8 parts of butyl acrylate, 2.0 parts of methacrylic acid, 2.0 parts of acrylonitrile, 1.0 part of allyl glycidyl ether, 1.2 parts of N-methylolacrylamide, 0.1 parts of sodium dodecyl sulfate, and 100 parts of ion exchange water were mixed to prepare a dispersion of a monomer mixture E.

This dispersion of the monomer mixture E was continuously added to the aforementioned mixture D over 4 hours to perform polymerization. The temperature of the reaction system was kept at 80° C. to perform the reaction while the dispersion of the monomer mixture E was continuously added. After the continuous addition was completed, the reaction was further continued at 90° C. for 3 hours. This provided an aqueous dispersion of seed polymer particles F having an average particle diameter of 370 nm.

Subsequently, in a reaction container equipped with a stirrer, 20 parts based on solid content (i.e., based on the weight of the seed polymer particles F) of the aqueous dispersion of the seed polymer particles F, 100 parts of ethylene glycol dimethacrylate ("Light Ester EG", Kyoeisha Chemical Co., Ltd.) as a monomer, 1.0 part of sodium dodecylbenzenesulfonate, 4.0 parts of t-butylperoxy-2-ethylhexanoate ("Perbutyl O", produced by NOF CORPORATION) as a polymerization initiator, and 200 parts of ion exchange water were placed and stirred at 35° C. for 12 hours to allow the seed polymer particles F to completely absorb the monomer and the polymerization initiator. Subsequently, the obtained product was subjected to polymerization at 90° C. for 5 hours. Steam was then introduced to remove unreacted monomers and initiator decomposition products. This provided an aqueous dispersion of non-conductive particles having a volume average particle diameter D50 of 670 nm as the polymer particles.

(1-4. Production of Porous Membrane Slurry)

The aqueous solution of the maleimide-maleic acid copolymer A1 obtained in the step (1-1), the aqueous dispersion of the binder obtained in the step (1-2), a leveling agent ("SN-WET 980", SAN NOPCO LIMITED), and the non-conductive particles obtained in the step (1-3) were mixed in water to have 7 parts (based on solid content) of the maleimide-maleic acid copolymer A1, 12 parts (based on solid content) of the binder, 1 part of the leveling agent relative to 100 parts by weight of the non-conductive particles, whereby a porous membrane slurry having a solid content concentration of 20% was obtained.

(1-5. Production of Particulate Polymer)

In a 5 MPa pressure-resistant container equipped with a stirrer, 22.2 parts of butyl acrylate as a (meth)acrylic acid ester monomer, 2 parts of methacrylic acid as an ethylenically unsaturated carboxylic acid monomer, 75 parts of styrene as an aromatic vinyl monomer, 0.8 parts of ethylene dimethacrylate as a crosslikable monomer, 1 part of sodium dodecylbenzenesulfonate as an emulsifier, 150 parts of ion exchange water, and 0.5 parts of potassium persulfate as a polymerization initiator were placed and stirred well. The obtained mixture was then heated to 60° C. to initiate polymerization. When the polymerization conversion rate reached 96%, the mixture was cooled to terminate the reaction. An aqueous dispersion containing a particulate polymer was thereby obtained. The obtained particulate polymer had a volume average particle diameter D50 of 0.15 μm and a glass transition temperature of 76° C.

(1-6. Production of Adhesive Layer Slurry)

100 parts based on solid content of the aqueous dispersion containing the particulate polymer obtained in the step (1-5), 4 parts based on solid content of the aqueous dispersion of the binder obtained in the step (1-2), and ion exchange water were mixed so that the solid content concentration was 20%, to obtain an adhesive layer slurry.

(1-7. Production of Porous Membrane Separator)

A separator substrate (16 μm thick) made of a polyethylene porous substrate was prepared. The porous membrane slurry was applied onto both surfaces of the prepared separator substrate and dried at 50° C. for 3 minutes. Thereby porous membranes having a thickness of 3 μm per layer were formed on the separator substrate.

Subsequently, the adhesive layer slurry was applied onto each of the porous membranes and dried at 50° C. for 1 minute to form adhesive layers having a thickness of 0.5 μm per layer. This provided a porous membrane separator including the adhesive layer, the porous membrane, the separator substrate, the porous membrane, and the adhesive layer in this order. With the obtained porous membrane separator, the peel strength, the heatshrink ability, the adhesion of the adhesive layer in the electrolyte solution, and the blocking resistance were evaluated.

(1-8. Production of Positive Electrode)

(Production of Positive Electrode)

To 95 parts of lithium manganate having a spinel structure as a positive electrode active material, 3 parts based on solid content of PVDF (polyvinylidene fluoride, produced by Kureha Corporation, trade name: KF-1100) as a binder was added, and 2 parts of acetylene black and 20 parts of N-methylpyrrolidone were further added and mixed using a planetary mixer to obtain an active material layer slurry for a positive electrode. This active material layer slurry for a positive electrode was applied onto one surface of an 18 μm thick aluminum foil and dried at 120° C. for 3 hours, followed by roll press to obtain a positive electrode having an electrode active material layer having a total thickness of 100 μm.

(1-9. Production of Negative Electrode)

98 parts of graphite having a particle diameter of 20 μm and a BET specific surface area of 4.2 m$^2$/g as a negative electrode active material and 1 part based on solid content of SBR (styrene-butadiene rubber, glass transition temperature: −10° C.) as a binder were mixed. To this mixture, 1 part of carboxymethyl cellulose was further added and water was further added as a solvent and mixed using a planetary mixer to obtain an active material layer slurry for a negative electrode. This active material layer slurry for a negative electrode was applied onto one surface of an 18 μm thick copper foil and dried at 120° C. for 3 hours, followed by roll press to obtain a negative electrode having an electrode active material layer having a total thickness of 60 μm.

(1-10. Production of Secondary Battery)

The aforementioned positive electrode was cut into a disc shape having a diameter of 13 mm to obtain a disc-shaped positive electrode. The aforementioned negative electrode was cut into a disc shape having a diameter of 14 mm to obtain a disc-shaped negative electrode. The aforementioned porous membrane separator was cut into a disc shape having a diameter of 18 mm to obtain a disc-shaped secondary battery separator.

The positive electrode was placed on the front surface of the disc-shaped secondary battery separator, and the negative electrode was stacked on the back surface. In this case, the positive active material layer of the positive electrode was in contact with one adhesive layer of the porous membrane separator, while the negative active material layer of the negative electrode was in contact with the other adhesive layer of the porous membrane separator. The positive electrode and the negative electrode were then pressure-bonded to the secondary battery separator by heat pressing at a temperature of 80° C. and a pressure of 0.5 MPa for 10 seconds. This produced a secondary battery laminate having a stacked structure of negative electrode/secondary battery separator/positive electrode, in which the positive electrode and the negative electrode adhere to the adhesive layers of the secondary battery separator.

The secondary battery laminate was placed on the inner bottom of a coin-type outer container made of stainless steel equipped with a polypropylene gasket, whereby this laminate was accommodated in the container. An electrolytic solution was injected into the container such that no air remained, and a 0.2 mm thick stainless steel cap was placed over the outer container via a polypropylene gasket, and fastened to seal a battery can, whereby a full-cell type lithium-ion secondary battery having a diameter of 20 mm and a thickness of about 3.2 mm (coin cell CR2032) was produced. As the electrolyte solution, a solution in which 1 mol/L of LiPF$_6$ was dissolved in a mixed solvent of ethylene carbonate (EC) and diethyl carbonate (DEC) at EC:DEC=1:2 (volume ratio at 20° C.) was used.

Example 2

As the non-conductive particles in the step (1-4), boehmite particles ("APYRAL AOH 60" produced by Nabaltec, volume average particle diameter D50=0.9 μm, plate-shaped particles) were used in place of polymer particles. In the step (1-4), the solid contents of the aqueous solution of the maleimide-maleic acid copolymer A1, the aqueous dispersion of the binder, and the leveling agent per 100 parts by weight of the non-conductive particles were changed to 1.5 parts, 4 parts, and 1 part, respectively. A porous membrane separator and a secondary battery were produced and evaluated in the same manner as in Example 1 except the aforementioned matters.

Example 3

As the non-conductive particles in the step (1-4), magnesium oxide particles ("PUREMAG FNM-G" produced by Tateho Chemical Industries Co., Ltd., volume average particle diameter D50=0.5 μm, a mixture of ellipsoidal particles and rounded polyhedral particles) were used in place of polymer particles. A porous membrane separator and a secondary battery were produced and evaluated in the same manner as in Example 2 except the aforementioned matters.

Example 4

Alumina particles (AKP-3000 produced by Sumitomo Chemical Co., Ltd., volume average particle diameter D50=0.45 μm, tetrapod-shaped particles) were prepared as the non-conductive particles. 100 parts of these non-conductive particles, 1.5 parts based on solid content of the aqueous solution of the maleimide-maleic acid copolymer A1 obtained in the step (1-1), and ion exchange water were mixed so that the solid content concentration was 40% by weight. Furthermore, 4 parts based on solid content of the aqueous dispersion of the binder obtained in the step (1-2) and 0.2 parts of polyethylene glycol-based surfactant ("SN WET 366", SAN NOPCO LIMITED) were mixed to produce a porous membrane slurry.

In the step (1-7), the porous membrane slurry produced in Example 4 was used in place of the porous membrane slurry produced in Example 1. A porous membrane separator and a secondary battery were produced and evaluated in the same manner as in Example 1 except the aforementioned matters.

Example 5

In the step (1-5), the amount of butyl acrylate was changed to 50.2 parts and further the amount of styrene was changed to 45 parts, whereby the glass transition temperature of the particulate polymer was adjusted to 15° C. A porous membrane separator and a secondary battery were produced and evaluated in the same manner as in Example 1 except the aforementioned matters.

Example 6

In the step (1-5), the amount of butyl acrylate was changed to 27.2 parts and further the amount of styrene was changed to 70 parts, whereby the glass transition temperature of the particulate polymer was adjusted to 27° C. A porous membrane separator and a secondary battery were produced and evaluated in the same manner as in Example 1 except the aforementioned matters.

Example 7

In the step (1-5), the amount of butyl acrylate was changed to 7.2 parts and further the amount of styrene was changed to 90 parts, whereby the glass transition temperature of the particulate polymer was adjusted to 93° C. A porous membrane separator and a secondary battery were produced and evaluated in the same manner as in Example 1 except the aforementioned matters.

Example 8

In a reaction container equipped with a stirrer, 100 parts of a styrene-maleic anhydride copolymer (Product name: Scripset 520, Hercules) was placed, and ammonia gas was supplied to the reaction container to perform a reaction (for about 1 hour) under cooling in a water bath until heat generation ceased. Subsequently ammonia gas was injected into the reaction container under heating in an oil bath, and generated water was distilled out of the system, while the temperature of the system was increased to 200° C. to perform the imidization reaction. After the completion of the reaction, the reaction product was taken out and dried by heating to obtain maleimide-maleic acid copolymer A8. The obtained maleimide-maleic acid copolymer A8 had a composition of 50 mol % styrene units, 18 mol % maleic anhydride units, 12 mol % maleic acid units, and 20 mol % maleimide units.

In a reaction container equipped with a stirrer, 100 parts of the obtained maleimide-maleic acid copolymer A8, 21.9 parts of sodium hydroxide, and 487.7 parts of ion exchange water were placed and stirred at 90° C. for 5 hours to obtain an aqueous solution of the maleimide-maleic acid copolymer A8 having a solid content concentration of 20%. The weight-average molecular weight of the maleimide-maleic acid copolymer A8 was 350,000.

In the step (1-4), the aqueous solution of the maleimide-maleic acid copolymer A8 was used in place of the aqueous solution of the maleimide-maleic acid copolymer A1. A porous membrane separator and a secondary battery were produced and evaluated in the same manner as in Example 1 except the aforementioned matters.

Example 9

In a reaction container equipped with a stirrer, 100 parts of an isobutylene-maleic anhydride copolymer al ("ISOBAM-04" produced by Kuraray Co., Ltd.), 28.3 parts of p-aminophenol, and 200 parts of N-methyl-2-pyrrolidone (NMP) were placed. These components were allowed to react at 80° C. for 2 hours as the first stage reaction to produce an N-(p-hydroxyphenyl) maleamic acid copolymer. Subsequently, the cyclodehydration reaction was carried out at 200° C. for 2 hours as the second stage reaction. After the completion of the reaction, the temperature of the solution was lowered to 40° C. or lower. This solution was added to 2000 parts of water, and the reaction product was taken out by precipitation. The taken reaction product was dried by heating to obtain a maleimide-maleic acid copolymer A9. The obtained maleimide-maleic acid copolymer A9 had a composition of 50 mol % isobutylene units, 18 mol % maleic anhydride units, 12 mol % maleic acid units, and 20 mol % N-(4-hydroxyphenyl)maleimide units.

In a reaction container equipped with a stirrer, 100 parts of the obtained maleimide-maleic acid copolymer A9 and 540 parts of 25% aqueous ammonia were placed and stirred at 90° C. for 5 hours to obtain an aqueous solution of the maleimide-maleic acid copolymer A9 having a solid content concentration of 20%. The weight-average molecular weight of the maleimide-maleic acid copolymer A9 was 60,000.

In the step (1-4), the aqueous solution of the maleimide-maleic acid copolymer A9 was used in place of the aqueous solution of the maleimide-maleic acid copolymer A1. A porous membrane separator and a secondary battery were produced and evaluated in the same manner as in Example 1 except the aforementioned matters.

Example 10

In the step (1-7), a porous membrane separator and a secondary battery were produced and evaluated in the same manner as in Example 1 except that the dry thickness of each adhesive layer was changed to 0.2 μm.

Example 11

In the step (1-7), a porous membrane separator and a secondary battery were produced and evaluated in the same manner as in Example 1 except that the dry thickness of each adhesive layer was changed to 3 μm.

Example 12

In an autoclave equipped with a stirrer, 400 parts of toluene, 28.3 parts of maleimide, 14.3 parts of maleic anhydride, 57.3 parts of isobutylene, and 1.0 part of azobisisobutyronitrile were placed and reaction was carried out at 80° C. for 5 hours. After the completion of the reaction, the precipitate was dried by heating to obtain a maleimide-maleic acid copolymer A12. The obtained maleimide-maleic acid copolymer A12 had a composition of 70 mol % isobutylene units, 10 mol % maleic anhydride units, and 20 mol % maleimide units.

In a reaction container equipped with a stirrer, 100 parts of the obtained maleimide-maleic acid copolymer A12, 21.9 parts of sodium hydroxide, and 487.7 parts of ion exchange water were placed and stirred at 90° C. for 5 hours to obtain an aqueous solution of the maleimide-maleic acid copolymer A12 having a solid content concentration of 20%. The weight-average molecular weight of the maleimide-maleic acid copolymer A12 was 60,000.

In the step (1-4), the aqueous solution of the maleimide-maleic acid copolymer A12 was used in place of the aqueous solution of the maleimide-maleic acid copolymer A1. The amount of the binder (based on solid content) with respect to 100 parts by weight of the non-conductive particles was changed to 4 parts in the step (1-4). A porous membrane separator and a secondary battery were produced and evaluated in the same manner as in Example 1 except the aforementioned matters.

Example 13

In an autoclave equipped with a stirrer, 400 parts of toluene, 59.6 parts of maleimide, 12.3 parts of maleic anhydride, 28 parts of isobutylene, and 1.0 part of azobisisobutyronitrile were placed and reaction was carried out at 80° C. for 5 hours. After the completion of the reaction, the precipitate was dried by heating to obtain a maleimide-maleic acid copolymer A13. The obtained maleimide-maleic acid copolymer A13 had a composition of 40 mol % isobutylene units, 10 mol % maleic anhydride units, and 50 mol % maleimide units.

In a reaction container equipped with a stirrer, 100 parts of the obtained maleimide-maleic acid copolymer A13, 21.9 parts of sodium hydroxide, and 487.7 parts of ion exchange water were placed and stirred at 90° C. for 5 hours to obtain an aqueous solution of the maleimide-maleic acid copolymer A13 having a solid content concentration of 20%. The weight-average molecular weight of the maleimide-maleic acid copolymer A13 was 60,000.

In the step (1-4), the aqueous solution of the maleimide-maleic acid copolymer A13 was used in place of the aqueous solution of the maleimide-maleic acid copolymer A1. The amount of the binder (based on solid content) with respect to 100 parts by weight of the non-conductive particles was changed to 4 parts in the step (1-4). A porous membrane separator and a secondary battery were produced and evaluated in the same manner as in Example 1 except the aforementioned matters.

Example 14

In an autoclave equipped with a stirrer, 400 parts of toluene, 12.3 parts of maleimide, 60.3 parts of maleic anhydride, 27.3 parts of isobutylene, and 1.0 part of azobisisobutyronitrile were placed and reaction was carried out at 80° C. for 5 hours. After the completion of the reaction, the precipitate was dried by heating to obtain a maleimide-maleic acid copolymer A14. The obtained maleimide-maleic acid copolymer A14 had a composition of 40 mol % isobutylene units, 50 mol % maleic anhydride units, and 10 mol % maleimide units.

In a reaction container equipped with a stirrer, 100 parts of the obtained maleimide-maleic acid copolymer A14, 21.9 parts of sodium hydroxide, and 487.7 parts of ion exchange water were placed and stirred at 90° C. for 5 hours to obtain an aqueous solution of the maleimide-maleic acid copolymer A14 having a solid content concentration of 20%. The weight-average molecular weight of the maleimide-maleic acid copolymer A14 was 60,000.

In the step (1-4), the aqueous solution of the maleimide-maleic acid copolymer A14 was used in place of the aqueous solution of the maleimide-maleic acid copolymer A1. The amount of the binder (based on solid content) with respect to 100 parts by weight of the non-conductive particles was changed to 4 parts in the step (1-4). A porous membrane separator and a secondary battery were produced and evaluated in the same manner as in Example 1 except the aforementioned matters.

Example 15

In an autoclave equipped with a stirrer, 400 parts of toluene, 41.3 parts of maleimide, 62.3 parts of maleic anhydride, 6.3 parts of isobutylene, and 1.0 part of azobisisobutyronitrile were placed and reaction was carried out at 80° C. for 5 hours. After the completion of the reaction, the precipitate was dried by heating to obtain a maleimide-maleic acid copolymer A15. The obtained maleimide-maleic acid copolymer A15 had a composition of 10 mol % isobutylene units, 50 mol % maleic anhydride units, and 40 mol % maleimide units.

In a reaction container equipped with a stirrer, 100 parts of the obtained maleimide-maleic anhydride copolymer A15, 21.9 parts of sodium hydroxide, and 487.7 parts of ion exchange water were placed and stirred at 90° C. for 5 hours to obtain an aqueous solution of the maleimide-maleic anhydride A15 having a solid content concentration of 20%. The weight-average molecular weight of the maleimide-maleic anhydride copolymer A15 was 60,000.

In the step (1-4), the aqueous solution of the maleimide-maleic acid copolymer A15 was used in place of the aqueous solution of the maleimide-maleic acid copolymer A1. The amount of the binder (based on solid content) with respect to 100 parts by weight of the non-conductive particles was changed to 4 parts in the step (1-4). A porous membrane separator and a secondary battery were produced and evaluated in the same manner as in Example 1 except the aforementioned matters.

Example 16

In the step (1-4), the amounts of the maleimide-maleic acid copolymer A1 (based on solid content) and the binder (based on solid content) with respect to 100 parts by weight of the non-conductive particles were changed to 14 parts and 4 parts, respectively. A porous membrane separator and a secondary battery were produced and evaluated in the same manner as in Example 1 except the aforementioned matters.

Comparative Example 1

A porous membrane separator and a secondary battery were produced and evaluated in the same manner as in Example 1 except that adhesive layer was not formed in the step (1-7).

Comparative Example 2

In a reaction container equipped with a stirrer, 100 parts of an isobutylene-maleic anhydride copolymer (product name: ISOBAM-04, Kuraray Co., Ltd.,), 41.5 parts of sodium hydroxide, and 566 parts of ion exchange water were placed and stirred for 5 hours to obtain an aqueous solution of a copolymer AC2 (isobutylene-maleic anhydride copolymer) having a solid content concentration of 20%. The weight-average molecular weight of the copolymer AC2 was 60,000.

In the step (1-4), an aqueous solution of the copolymer AC2 was used in place of the aqueous solution of the maleimide-maleic acid copolymer A1. A porous membrane separator and a secondary battery were produced and evaluated in the same manner as in Example 1 except the aforementioned matters.

Comparative Example 3

In an autoclave equipped with a stirrer, 400 g of toluene, 63.4 g of maleimide, 36.6 g of isobutylene, and 1.0 g of azobisisobutyronitrile were placed and reaction was carried out at 80° C. for 5 hours. After the completion of the reaction, the precipitate was dried by heating to obtain a maleimide-isobutylene copolymer. The obtained maleimide-isobutylene copolymer AC3 had a composition of 50 mol % maleimide units and 50 mol % isobutylene units. In a reaction container equipped with a stirrer, 100 parts of the obtained maleimide-isobutylene copolymer AC3, 27.8 parts of 25% aqueous ammonia, and 588.8 parts of ion exchange water were placed and stirred at 90° C. for 5 hours to obtain an aqueous solution of the copolymer AC3 having a solid content concentration of 15%. The weight-average molecular weight of the copolymer AC3 was 60,000.

In the step (1-4), the aqueous solution of the copolymer AC3 was used in place of the aqueous solution of the maleimide-maleic acid copolymer A1. A porous membrane separator and a secondary battery were produced and evaluated in the same manner as in Example 1 except the aforementioned matters.

Comparative Example 4

In the step (1-5), the amount of butyl acrylate was changed to 4.2 parts and the amount of methacrylic acid was changed to 10 parts, and further the amount of styrene was changed to 85 parts, whereby the glass transition temperature of the particulate polymer was adjusted to 114° C. A porous membrane separator and a secondary battery were produced and evaluated in the same manner as in Example 1 except the aforementioned matters.

Comparative Example 5

In the step (1-5), 87.8 parts of ethyl acrylate was used in place of butyl acrylate, 10 parts of acrylonitrile as the (meth)acrylonitrile monomer was used in place of styrene, and further the amount of ethylene dimethacrylate was changed to 0.2 parts, whereby the glass transition temperature of the particulate polymer was adjusted to 5° C. A porous membrane separator and a secondary battery were produced and evaluated in the same manner as in Example 1 except the aforementioned matters.

Comparative Example 6

In the step (1-4), the aqueous solution of the maleimide-maleic acid copolymer A1 was not used. In the step (1-7), the dry thickness of each adhesive layer was changed to 10 µm. A porous membrane separator and a secondary battery were produced and evaluated in the same manner as in Example 1 except the aforementioned matters.

[Results]

The components of Examples and Comparative Examples are described in Tables 1 to 6, and the results are described in Tables 7 to 9. The meanings of the abbreviations in the tables are as follows.

Binder amount: Amount of binder with respect to 100 parts of non-conductive particles Binder composition: Weight ratio of (meth)acrylonitrile monomer units/(meth)acrylic acid ester monomer units in binder Monomer I: (Meth)acrylic acid ester monomer
Monomer II: Ethylenically unsaturated carboxylic acid monomer
Monomer III: Aromatic vinyl monomer
Monomer IV: (Meth)acrylonitrile monomer
Monomer V: Crosslikable monomer
MI/MA copolymer: Maleimide-maleic acid copolymer
MI: Maleimide
HPMI: N-(4-hydroxyphenyl)maleimide
MA: Maleic acid or maleic anhydride
Mw: Weight-average molecular weight
IB: Isobutylene
BA: Butyl acrylate
EA: Ethyl acrylate
MAA: Methacrylic acid
ST: Styrene
AN: Acrylonitrile
EDMA: Ethylene dimethacrylate
ACL: Acrylic rubber
Tg: Glass transition temperature
Redissolution Rate: Redissolution rate of maleimide-maleic acid copolymer film in water
Peel strength: Peel strength of porous membrane separator
Heatshrink ability: Heatshrink ability of porous membrane separator
Adhesion: Adhesion of adhesive layer in electrolyte solution
Blocking resistance: Blocking resistance of porous membrane separator

TABLE 1

| Components of Example 1 to Example 4 | | | Ex. 1 | Ex. 2 | Ex. 3 | Ex. 4 |
|---|---|---|---|---|---|---|
| Porous membrane | | | | | | |
| Non-conductive particle | Type | | Polymer | Boehmite | Magnesium oxide | Alumina |
| | Shape | | Spherical | Plate | Ellipsoidal/rounded polyhedral | Tetrapod |
| MI/MA copolymer | Structural unit (a) | | MI | MI | MI | MI |
| | Amount of structural unit (a) (mol %) | | 20 | 20 | 20 | 20 |

TABLE 1-continued

Components of Example 1 to Example 4

|  |  | Ex. 1 | Ex. 2 | Ex. 3 | Ex. 4 |
|---|---|---|---|---|---|
| Binder | Structural unit (b) | MA | MA | MA | MA |
|  | Amount of structural unit (b) (mol %) | 30 | 30 | 30 | 30 |
|  | Structural unit (c) | IB | IB | IB | IB |
|  | Amount of structural unit (c) (mol %) | 50 | 50 | 50 | 50 |
|  | Mw | 60000 | 60000 | 60000 | 60000 |
|  | Neutralizing ion | $NH_4^+$ | $NH_4^+$ | $NH_4^+$ | $NH_4^+$ |
|  | Amount (parts) | 7 | 1.5 | 1.5 | 1.5 |
|  | Type | ACL | ACL | ACL | ACL |
|  | Amount (parts) | 12 | 4 | 4 | 4 |
|  | Binder composition | 2/98 | 2/98 | 2/98 | 2/98 |
|  | Thickness (μm) Adhesive layer | 3 | 3 | 3 | 3 |
| Particulate polymer | Type of monomer I | BA | BA | BA | BA |
|  | Amount of monomer I (wt %) | 22.2 | 22.2 | 22.2 | 22.2 |
|  | Type of monomer II | MAA | MAA | MAA | MAA |
|  | Amount of monomer II (wt %) | 2 | 2 | 2 | 2 |
|  | Type of monomer III | ST | ST | ST | ST |
|  | Amount of monomer III (wt %) | 75 | 75 | 75 | 75 |
|  | Type of monomer IV | — | — | — | — |
|  | Amount of monomer IV (wt %) | — | — | — | — |
|  | Type of monomer V | EDMA | EDMA | EDMA | EDMA |
|  | Amount of monomer V (wt %) | 0.8 | 0.8 | 0.8 | 0.8 |
|  | Tg(° C.) | 76 | 76 | 76 | 76 |
|  | Particle diameter (μm) | 0.15 | 0.15 | 0.15 | 0.15 |
| Binder | Type | ACL | ACL | ACL | ACL |
|  | Thickness (μm) | 0.5 | 0.5 | 0.5 | 0.5 |

TABLE 2

Components of Example 5 to Example 8

|  |  | Ex. 5 | Ex. 6 | Ex. 7 | Ex. 8 |
|---|---|---|---|---|---|
| Porous membrane |  |  |  |  |  |
| Non-conductive particle | Type | Polymer | Polymer | Polymer | Polymer |
|  | Shape | Spherical | Spherical | Spherical | Spherical |
| MI/MA copolymer | Structural unit (a) | MI | MI | MI | MI |
|  | Amount of structural unit (a) (mol %) | 20 | 20 | 20 | 20 |
|  | Structural unit (b) | MA | MA | MA | MA |
|  | Amount of structural unit (b) (mol %) | 30 | 30 | 30 | 30 |
|  | Structural unit (c) | IB | IB | IB | ST |
|  | Amount of structural unit (c) (mol %) | 50 | 50 | 50 | 50 |
|  | Mw | 60000 | 60000 | 60000 | 350000 |
|  | Neutralizing ion | $NH_4^+$ | $NH_4^+$ | $NH_4^+$ | $Na^+$ |
|  | Amount (parts) | 7 | 7 | 7 | 7 |
| Binder | Type | ACL | ACL | ACL | ACL |
|  | Amount (parts) | 12 | 12 | 12 | 12 |
|  | Binder composition | 2/98 | 2/98 | 2/98 | 2/98 |
|  | Thickness (μm) | 3 | 3 | 3 | 3 |

TABLE 2-continued

| | Components of Example 5 to Example 8 | | | | |
|---|---|---|---|---|---|
| | | Ex. 5 | Ex. 6 | Ex. 7 | Ex. 8 |
| | Adhesive layer | | | | |
| Particulate polymer | Type of monomer I | BA | BA | BA | BA |
| | Amount of monomer I (wt %) | 50.2 | 27.2 | 7.2 | 22.2 |
| | Type of monomer II | MAA | MAA | MAA | MAA |
| | Amount of monomer II (wt %) | 2 | 2 | 2 | 2 |
| | Type of monomer III | ST | ST | ST | ST |
| | Amount of monomer III (wt %) | 45 | 70 | 90 | 75 |
| | Type of monomer IV | — | — | — | — |
| | Amount of monomer IV(wt %) | — | — | — | — |
| | Type of monomer V | EDMA | EDMA | EDMA | EDMA |
| | Amount of monomer V (wt %) | 0.8 | 0.8 | 0.8 | 0.8 |
| | Tg(° C.) | 15 | 27 | 93 | 76 |
| | Particle diameter(μm) | 0.15 | 0.15 | 0.15 | 0.15 |
| Binder | Type | ACL | ACL | ACL | ACL |
| | Thickness (μm) | 0.5 | 0.5 | 0.5 | 0.5 |

TABLE 3

| | Components of Example 9 to Example 12 | | | | |
|---|---|---|---|---|---|
| | | Ex. 9 | Ex. 10 | Ex. 11 | Ex. 12 |
| | Porous membrane | | | | |
| Non-conductive particle | Type | Polymer | Polymer | Polymer | Polymer |
| | Shape | Spherical | Spherical | Spherical | Spherical |
| MI/MA copolymer | Structural unit (a) | HPMI | MI | MI | MI |
| | Amount of structural unit (a) (mol %) | 20 | 20 | 20 | 20 |
| | Structural unit (b) | MA | MA | MA | MA |
| | Amount of structural unit (b) (mol %) | 30 | 30 | 30 | 10 |
| | Structural unit (c) | IB | IB | IB | IB |
| | Amount of structural unit (c) (mol %) | 50 | 50 | 50 | 70 |
| | Mw | 60000 | 60000 | 60000 | 60000 |
| | Neutralizing ion | $NH_4^+$ | $NH_4^+$ | $NH_4^+$ | $NH_4^+$ |
| | Amount (parts) | 7 | 7 | 7 | 7 |
| Binder | Type | ACL | ACL | ACL | ACL |
| | Amount (parts) | 12 | 12 | 12 | 4 |
| | Binder composition | 2/98 | 2/98 | 2/98 | 2/98 |
| | Thickness (μm) | 3 | 3 | 3 | 3 |
| | Adhesive layer | | | | |
| Particulate polymer | Type of monomer I | BA | BA | BA | BA |
| | Amount of monomer I (wt %) | 22.2 | 22.2 | 22.2 | 22.2 |
| | Type of monomer II | MAA | MAA | MAA | MAA |
| | Amount of monomer II (wt %) | 2 | 2 | 2 | 2 |
| | Type of monomer III | ST | ST | ST | ST |
| | Amount of monomer III (wt %) | 75 | 75 | 75 | 75 |

TABLE 3-continued

Components of Example 9 to Example 12

|  |  | Ex. 9 | Ex. 10 | Ex. 11 | Ex. 12 |
|---|---|---|---|---|---|
|  | Type of monomer IV | — | — | — | — |
|  | Amount of monomer IV (wt %) | — | — | — | — |
|  | Type of monomer V | EDMA | EDMA | EDMA | EDMA |
|  | Amount of monomer V (wt %) | 0.8 | 0.8 | 0.8 | 0.8 |
|  | Tg(° C.) | 76 | 76 | 76 | 76 |
|  | Particle diameter (μm) | 0.15 | 0.15 | 0.15 | 0.15 |
| Binder | Type | ACL | ACL | ACL | ACL |
|  | Thickness (μm) | 0.5 | 0.2 | 3 | 0.5 |

TABLE 4

Components of Example 13 to Example 16

|  |  | Ex. 13 | Ex. 14 | Ex. 15 | Ex. 16 |
|---|---|---|---|---|---|
|  | Porous membrane |  |  |  |  |
| Non conductive particle | Type Shape | Polymer Spherical | Polymer Spherical | Polymer Spherical | Polymer Spherical |
| MI/MA copolymer | Structural unit (a) | MI | MI | MI | MI |
|  | Amount of structural unit (a) (mol %) | 50 | 10 | 40 | 20 |
|  | Structural unit (b) | MA | MA | MA | MA |
|  | Amount of structural unit (b) (mol %) | 10 | 50 | 50 | 30 |
|  | Structural unit (c) | IB | IB | IB | IB |
|  | Amount of structural unit (c) (mol %) | 40 | 40 | 10 | 50 |
|  | Mw | 60000 | 60000 | 60000 | 60000 |
|  | Neutralizing ion | $NH_4^+$ | $NH_4^+$ | $NH_4^+$ | $NH_4^+$ |
|  | Amount (parts) | 7 | 7 | 7 | 14 |
| Binder | Type | ACL | ACL | ACL | ACL |
|  | Amount (parts) | 4 | 4 | 4 | 4 |
|  | Binder composition | 2/98 | 2/98 | 2/98 | 2/98 |
|  | Thickness (μm) | 3 | 3 | 3 | 3 |
|  | Adhesive layer |  |  |  |  |
| Particulate polymer | Type of monomer I | BA | BA | BA | BA |
|  | Amount of monomer I (wt %) | 22.2 | 22.2 | 22.2 | 22.2 |
|  | Type of monomer II | MAA | MAA | MAA | MAA |
|  | Amount of monomer II (wt %) | 2 | 2 | 2 | 2 |
|  | Type of monomer III | ST | ST | ST | ST |
|  | Amount of monomer III (wt %) | 75 | 75 | 75 | 75 |
|  | Type of monomer IV | — | — | — | — |
|  | Amount of monomer IV (wt %) | — | — | — | — |
|  | Type of monomer V | EDMA | EDMA | EDMA | EDMA |
|  | Amount of monomer V (wt %) | 0.8 | 0.8 | 0.8 | 0.8 |
|  | Tg(° C.) | 76 | 76 | 76 | 76 |
|  | Particle diameter (μm) | 0.15 | 0.15 | 0.15 | 0.15 |
| Binder | Type | ACL | ACL | ACL | ACL |
|  | Thickness (μm) | 0.5 | 0.5 | 0.5 | 0.5 |

TABLE 5

Components of Comparative Example 1 to Comparative Example 4

|  |  | Comp. Ex. 1 | Comp. Ex. 2 | Comp. Ex. 3 | Comp. Ex. 4 |
|---|---|---|---|---|---|
| Porous membrane | | | | | |
| Non-conductive particle | Type Shape | Polymer Spherical | Polymer Spherical | Polymer Spherical | Polymer Spherical |
| MI/MA copolymer | Structural unit (a) | MI | — | MI | MI |
|  | Amount of structural unit (a) (mol %) | 20 | — | 50 | 20 |
|  | Structural unit (b) | MA | MA | — | MA |
|  | Amount of structural unit (b) (mol %) | 30 | 50 | — | 30 |
|  | Structural unit (c) | IB | IB | IB | IB |
|  | Amount of structural unit (c) (mol %) | 50 | 50 | 50 | 50 |
|  | Mw | 60000 | 60000 | 60000 | 60000 |
|  | Neutralizing ion | $NH_4^+$ | $NH_4^+$ | $NH_4^+$ | $NH_4^+$ |
|  | Amount (parts) | 7 | 7 | 7 | 7 |
| Binder | Type | ACL | ACL | ACL | ACL |
|  | Amount (parts) | 12 | 12 | 12 | 12 |
|  | Binder composition | 2/98 | 2/98 | 2/98 | 2/98 |
|  | Thickness (μm) | 3 | 3 | 3 | 3 |
| Adhesive layer | | | | | |
| Particulate polymer | Type of monomer I | — | BA | BA | BA |
|  | Amount of monomer I (wt %) | — | 22.2 | 22.2 | 4.2 |
|  | Type of monomer II | — | MAA | MAA | MAA |
|  | Amount of monomer II (wt %) | — | 2 | 2 | 10 |
|  | Type of monomer III | — | ST | ST | ST |
|  | Amount of monomer III (wt %) | — | 75 | 75 | 85 |
|  | Type of monomer IV | — | — | — | — |
|  | Amount of monomer IV (wt %) | — | — | — | — |
|  | Type of monomer V | — | EDMA | EDMA | EDMA |
|  | Amount of monomer V (wt %) | — | 0.8 | 0.8 | 0.8 |
|  | Tg (°C.) | — | 76 | 76 | 114 |
|  | Particle diameter (μm) | — | 0.15 | 0.15 | 0.15 |
| Binder | Type | — | ACL | ACL | ACL |
|  | Thickness (μm) | — | 0.5 | 0.5 | 0.5 |

TABLE 6

Components of Comparative Example 5 and Comparative Example 6

|  |  | Comp. Ex. 5 | Comp. Ex. 6 |
|---|---|---|---|
| Porous membrane | | | |
| Non-conductive particle | Type Shape | Polymer Spherical | Polymer Spherical |
| MI/MA copolymer | Structural unit (a) | MI | — |
|  | Amount of structural unit (a) (mol %) | 20 | — |

TABLE 6-continued

Components of Comparative Example 5 and Comparative Example 6

|  |  | Comp. Ex. 5 | Comp. Ex. 6 |
|---|---|---|---|
|  | Structural unit (b) | MA | — |
|  | Amount of structural unit (b) (mol %) | 30 | — |
|  | Structural unit (c) | IB | — |
|  | Amount of structural unit (c) (mol %) | 50 | — |
|  | Mw | 60000 | — |
|  | Neutralizing ion | $NH_4^+$ | — |
|  | Amount (parts) | 7 | — |
| Binder | Type | ACL | ACL |
|  | Amount (parts) | 12 | 12 |
|  | Binder composition | 2/98 | 2/98 |
|  | Thickness (μm) Adhesive layer | 3 | 3 |
| Particulate polymer | Type of monomer I | EA | BA |
|  | Amount of monomer I (wt %) | 87.8 | 22.2 |
|  | Type of monomer II | MAA | MAA |
|  | Amount of monomer II (wt %) | 2 | 2 |
|  | Type of monomer III | — | ST |
|  | Amount of monomer III (wt %) | — | 75 |
|  | Type of monomer IV | AN | — |
|  | Amount of monomer IV (wt %) | 10 | — |
|  | Type of monomer V | EDMA | EDMA |
|  | Amount of monomer V (wt %) | 0.2 | 0.8 |
|  | Tg (° C.) | 5 | 76 |
|  | Particle diameter (μm) | 0.15 | 0.15 |
| Binder | Type | ACL | ACL |
|  | Thickness (μm) | 0.5 | 10 |

TABLE 7

Results of Example 1 to Example 8

| Example number | 1 | 2 | 3 | 4 | 5 | 6 | 7 | 8 |
|---|---|---|---|---|---|---|---|---|
| Redissolution rate | A | A | A | A | A | A | A | B |
| Peel strength | A | A | B | A | A | A | A | B |
| Heatshrink ability | A | A | A | A | A | A | A | A |
| Adhesion | A | A | A | A | A | A | B | A |
| Blocking resisitance | A | A | A | A | C | B | A | A |

TABLE 8

Results of Example 9 to Example 16

| Example number | 9 | 10 | 11 | 12 | 13 | 14 | 15 | 16 |
|---|---|---|---|---|---|---|---|---|
| Redissolution rate | B | A | A | A | A | B | B | A |
| Peel strength | A | A | A | B | B | B | B | A |
| Heatshrink ability | A | A | A | B | A | A | A | A |
| Adhesion | A | B | A | B | B | B | B | A |
| Blocking resisitance | A | A | A | B | A | A | A | A |

TABLE 9

Results of Comparative Example 1 to Comparative Example 6

| Comparative Example number | 1 | 2 | 3 | 4 | 5 | 6 |
|---|---|---|---|---|---|---|
| Redissolution rate | A | C | B | A | A | — |
| Peel strength | A | A | A | A | A | C |
| Heatshrink ability | A | C | D | A | A | D |
| Adhesion | C | A | A | C | — | A |
| Blocking resisitance | A | A | A | A | C | A |

[Discussion]

From Examples, it was confirmed that the present invention successfully achieved the porous membrane separator which has excellent anti-heatshrink ability and blocking resistance in a well-balanced manner and can adhere to the electrode with high adhesive strength. It was also confirmed that the use of this porous membrane separator successfully achieved a secondary battery having excellent electrical properties such as cycle property.

The invention claimed is:

1. A porous membrane separator for a secondary battery, comprising a separator substrate, a porous membrane formed on at least one surface of the separator substrate, and an adhesive layer formed on the porous membrane, wherein
the porous membrane contains non-conductive particles and a water-soluble maleimide-maleic acid copolymer including a structural unit (a) represented by the following formula (I) and a structural unit (b) represented by the following formula (II),
the maleimide-maleic acid copolymer includes the structural unit (b) at 30 mol % or more and 75 mol % or less,
the adhesive layer contains a particulate polymer having a glass transition temperature of 30° C. or higher and 110° C. or lower,

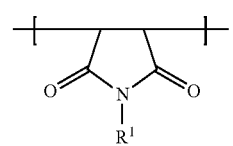

(I)

(in the formula (I), $R^1$ represents at least one selected from the group consisting of a hydrogen atom, C1 to C6 alkyl groups, C3 to C12 cycloalkyl groups, a phenyl group, a phenyl group substituted by a C1 to C6 alkyl group, a phenyl group substituted by a C1 to C6 alkyloxy group, a phenyl group substituted by a halogen atom, and a hydroxyphenyl group),

 (II)

(in the formula (II), X represents a maleic acid unit, X may be partially neutralized by an ion other than a hydrogen ion, or may be partially dehydrated, or may be partially esterified), and the particulate polymer is a polymer including aromatic vinyl monomer units, and the ratio of the aromatic vinyl monomer units with respect to the total units of the particulate polymer is 70% by weight or more, and 95% by weight or less.

2. The porous membrane separator for a secondary battery according to claim 1, wherein the maleimide-maleic acid copolymer includes the structural unit (a) at 5 mol % or more and 75 mol % or less.

3. The porous membrane separator for a secondary battery according to claim 1, wherein the maleimide-maleic acid copolymer further includes a structural unit (c) represented by the following formula (III),

 (III)

(in the formula (III), Y represents a C2 to C12 hydrocarbon group).

4. The porous membrane separator for a secondary battery according to claim 1, wherein the particulate polymer includes a crosslinkable monomer unit, and the content ratio of the crosslinkable monomer unit in the particulate polymer is 0.01% by weight or more and 5% by weight or less.

5. The porous membrane separator for a secondary battery according to claim 1, wherein a content amount of the maleimide-maleic acid copolymer is 0.1 parts by weight or more and 30 parts by weight or less relative to 100 parts by weight of the non-conductive particles.

6. A method for producing a porous membrane separator for a secondary battery, the method comprising the steps of:

applying a porous membrane slurry onto at least one surface of a separator substrate, the porous membrane slurry containing non-conductive particles and a water-soluble maleimide-maleic acid copolymer including a structural unit (a) represented by the following formula (I) and structural unit (b) represented by the following formula (II), followed by drying to form a porous membrane;

wherein the maleimide-maleic acid copolymer includes the structural unit (b) at 30 mol % or more and 75 mol % or less, and applying an adhesive layer slurry onto the porous membrane, the adhesive layer slurry containing a particulate polymer having a glass transition temperature of 30° C. or higher and 100° C. or lower, followed by drying to form an adhesive layer,

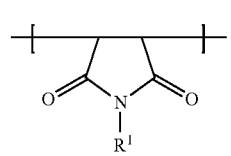 (I)

(in the formula (I), $R^1$ represents at least one selected from the group consisting of a hydrogen atom, C1 to C6 alkyl groups, C3 to C12 cycloalkyl groups, a phenyl group, a phenyl group substituted by a C1 to C6 alkyl group, a phenyl group substituted by a C1 to C6 alkyloxy group, a phenyl group substituted by a halogen atom, and a hydroxyphenyl group),

 (II)

(in the formula (II), X represents a maleic acid unit, X may be partially neutralized by an ion other than a hydrogen ion, or may be partially dehydrated, or may be partially esterified), wherein the particulate polymer is a polymer including aromatic vinyl monomer units, and the ratio of the aromatic vinyl monomer units with respect to the total units of the particulate polymer is 70% by weight or more, and 95% by weight or less.

7. A secondary battery, comprising a positive electrode, a negative electrode, the porous membrane separator for a secondary battery according to claim 1, and an electrolyte solution.

* * * * *